(12) United States Patent
Dobrin

(10) Patent No.: US 12,077,200 B2
(45) Date of Patent: Sep. 3, 2024

(54) SKI WINTER SPORTS DEVICE, MORE PARTICULARLY SKI TRIKE, FOR SLIDING DOWNHILL, HAVING THREE SKIS

(71) Applicants: REALIZATION BY INVESTMENT 4.0 RISIKOKAPITALGESELLSCHAFT MBH, Munich (DE); Alin Dobrin, Santa Cruz de Tenerife (ES)

(72) Inventor: Alin Dobrin, Santa Cruz de Tenerife (ES)

(73) Assignees: REALIZATION BY INVESTMENT 4.0 RISIKOGESELLSCHAFT MBH, Munich (DE); Alin Dobrin, Santa Cruz de Tenerife (ES)

( * ) Notice: Subject to any disclaimer, the term of this patent is extended or adjusted under 35 U.S.C. 154(b) by 0 days.

(21) Appl. No.: 17/926,134

(22) PCT Filed: May 19, 2021

(86) PCT No.: PCT/EP2021/063362
§ 371 (c)(1),
(2) Date: Nov. 18, 2022

(87) PCT Pub. No.: WO2021/234039
PCT Pub. Date: Nov. 25, 2021

(65) Prior Publication Data
US 2023/0242170 A1 Aug. 3, 2023

(30) Foreign Application Priority Data
May 19, 2020 (DE) .................. 10 2020 002 987.6

(51) Int. Cl.
*B62B 13/08* (2006.01)
*B62B 13/16* (2006.01)

(52) U.S. Cl.
CPC .............. *B62B 13/08* (2013.01); *B62B 13/16* (2013.01)

(58) Field of Classification Search
CPC ......... B62B 13/08; B62B 13/16; B62B 13/10; B62B 17/062; B62B 17/065;
(Continued)

(56) References Cited

U.S. PATENT DOCUMENTS 2,513,199 A * 6/1950 Ohlhaver ............... B62B 17/065
  280/14.28
6,783,134 B2 * 8/2004 Geary .................... B62B 13/16
  280/22.1
(Continued)

FOREIGN PATENT DOCUMENTS

CN  201012727 Y * 1/2008
CN  201148187 Y * 11/2008
(Continued)

*Primary Examiner* — James A Shriver, II
*Assistant Examiner* — Michael T. Walsh
(74) *Attorney, Agent, or Firm* — Norman B. Thot

(57) ABSTRACT

A ski winter sports device for sliding down a hill. The ski winter sports device includes a first ski, a second ski and a third ski, a standing device on which a user can stand, a holding device, and a frame. The first and second skis are arrangeable on the standing device next to each other in a direction of travel so that the first ski is available for a first foot of the user and the second ski is available for a second foot of the user. The holding device can be held by at least one hand of the user. The frame connects the standing device to the holding device. The frame is connected to the standing device in a relatively movable manner. The frame and the standing device are foldable relative to each other so that a spatial volume of the ski winter sports device is reducible.

20 Claims, 17 Drawing Sheets

(58) Field of Classification Search
CPC ....... A63C 2203/10; A63C 5/02; A63C 5/033; A63C 5/06; A63C 5/16
See application file for complete search history.

(56) References Cited

U.S. PATENT DOCUMENTS

| | | | | |
|---|---|---|---|---|
| 9,776,653 | B2* | 10/2017 | Marrder | ................ B62B 17/065 |
| 11,753,061 | B2* | 9/2023 | Gostoli | .................... A63C 5/06 |
| | | | | 280/14.28 |
| 2005/0212245 | A1* | 9/2005 | Fernandez | ............. B62K 3/002 |
| | | | | 280/87.041 |
| 2009/0058023 | A1 | 3/2009 | Spencer et al. | |
| 2015/0353117 | A1* | 12/2015 | Peng | ....................... B62B 13/10 |
| | | | | 280/14.21 |
| 2017/0057534 | A1 | 3/2017 | Marrder et al. | |
| 2019/0061800 | A1* | 2/2019 | Carrig | .................... B62B 13/08 |

FOREIGN PATENT DOCUMENTS

| | | |
|---|---|---|
| DE | 28 23 004 A1 | 11/1979 |
| DE | 29 02 563 A1 | 8/1980 |
| DE | 10 2020 002 986 B3 | 8/2021 |
| KR | 10-2004-0063645 A | 7/2004 |
| WO | WO-9842559 A1 * 10/1998 | ............. B62B 13/08 |

\* cited by examiner

SKI WINTER SPORTS DEVICE, MORE PARTICULARLY SKI TRIKE, FOR SLIDING DOWNHILL, HAVING THREE SKIS

CROSS REFERENCE TO PRIOR APPLICATIONS

This application is a U.S. National Phase application under 35 U.S.C. § 371 of International Application No. PCT/EP2021/063362, filed on May 19, 2021 and which claims benefit to German Patent Application No. 10 2020 002 987.6, filed on May 19, 2020. The International Application was published in German on Nov. 25, 2021 as WO 2021/234039 A1 under PCT Article 21(2).

FIELD

The present invention relates to a ski winter sports device, in particular a ski trike, for downhill sliding with three skis.

BACKGROUND

US 2017/0057534 A1 describes a "ski bike with multiple steering components" is known, which has three skis arranged similar to a tricycle.

With this "ski bike", a user stands on a standing device, which has two skis arranged side by side to provide one ski for each foot of a user. A holding device for holding on by hand offers the user the possibility to hold on. As a result, a user stands on the "ski-bike" similar to a bicycle, wherein the pedals and the front wheel are replaced by skis, and wherein the rear wheel is omitted.

With this "ski bike", however, it is awkward to ride in a cable car gondola, as it requires a considerable amount of space and a large volume of space that is necessary for transportation, respectively.

This means, for example, that instead of eight skiers with skis, only two or three "ski bikers" with their "ski bikes" can use a single gondola. This is a problem especially in ski resorts with high occupancy rates, as fewer people can be transported.

SUMMARY

An aspect of the present invention is to provide a ski winter sports device, more particularly a ski trike, for downhill sliding with three skis, which can, for example, be manufactured in a cost-effective and material-saving manner and which occupies a small volume of space and has a small space requirement, respectively, in order, for example, to enable the transport of as many persons as possible during transport in a gondola.

In an embodiment, the present invention provides a ski winter sports device for sliding down a hill. The ski winter sports device includes three skis comprising a first ski, a second ski, and a third ski, a standing device which is configured to have a user stand thereon, a holding device which can be held by at least one hand of the user, and a frame which is configured to connect the standing device to the holding device. The frame is connected to the standing device in a relatively movable manner. The first ski and the second ski are arrangeable on the standing device next to each other in a direction of travel so that the first ski is available for a first foot of the user and the second ski is available for a second foot of the user. The frame and the standing device are configured to be foldable relative to each other so that a required spatial volume of the ski winter sports device can be reduced. In the operating state in which the ski winter sports device is ready for use for sliding down the hill, the relative movement of the frame and the standing device with respect to one another is limited so that the frame and the standing device can be moved relative to one another within a limited range or a limited angular range so as to provide a safe sliding down the hill. In the transport state in which the ski winter sports device is transportable to the place of use, the relative movement of the frame and the standing device is increased so that the frame and the standing device are movable relative to each other beyond the limited range or the limited angular range, so that the required spatial volume of the ski winter sports device can be reduced compared to the operating state.

BRIEF DESCRIPTION OF THE DRAWINGS

The present invention is described in greater detail below on the basis of embodiments and of the drawings in which:

DETAILED DESCRIPTION

Figure 1:
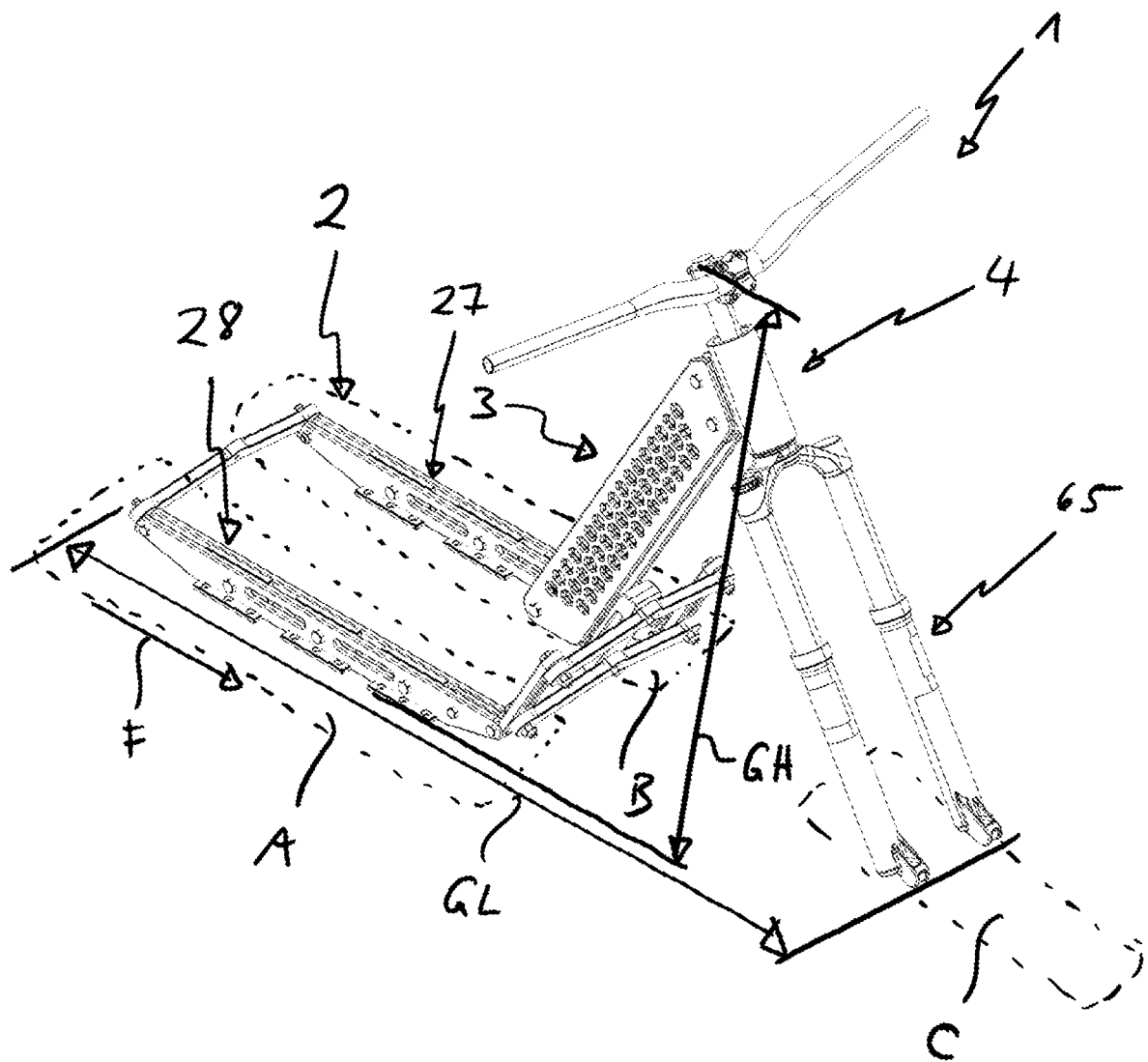
Figure 2:
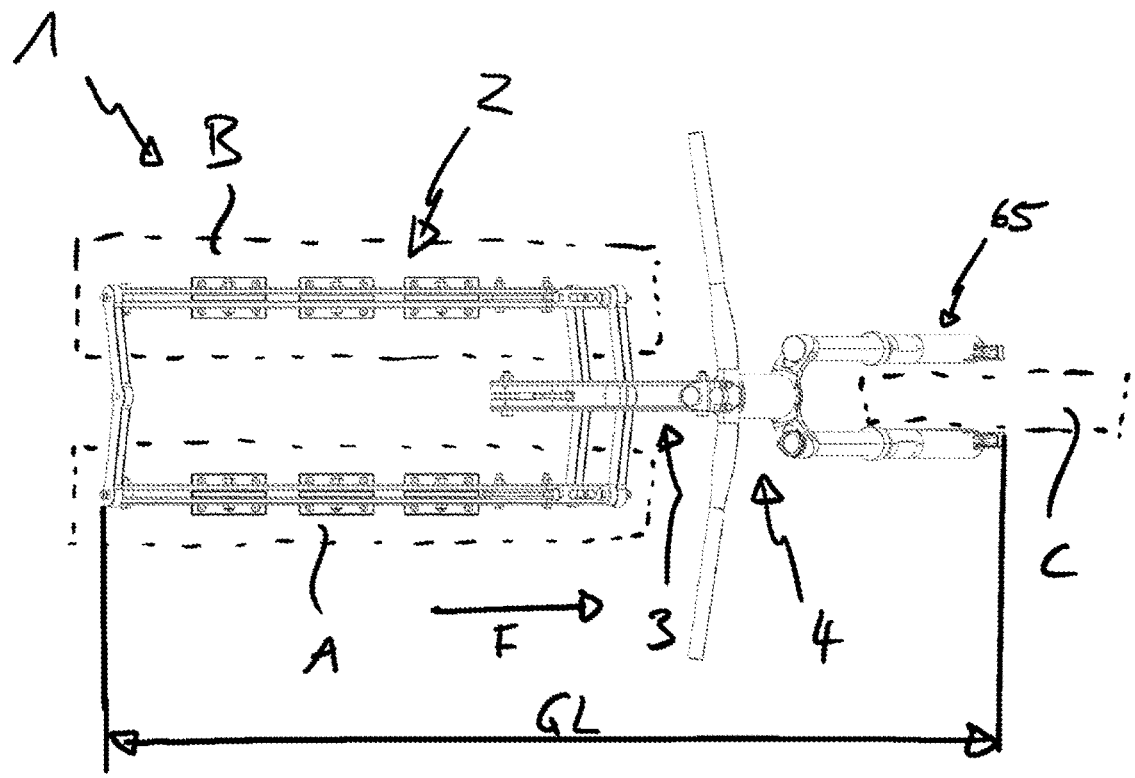
Figure 3:
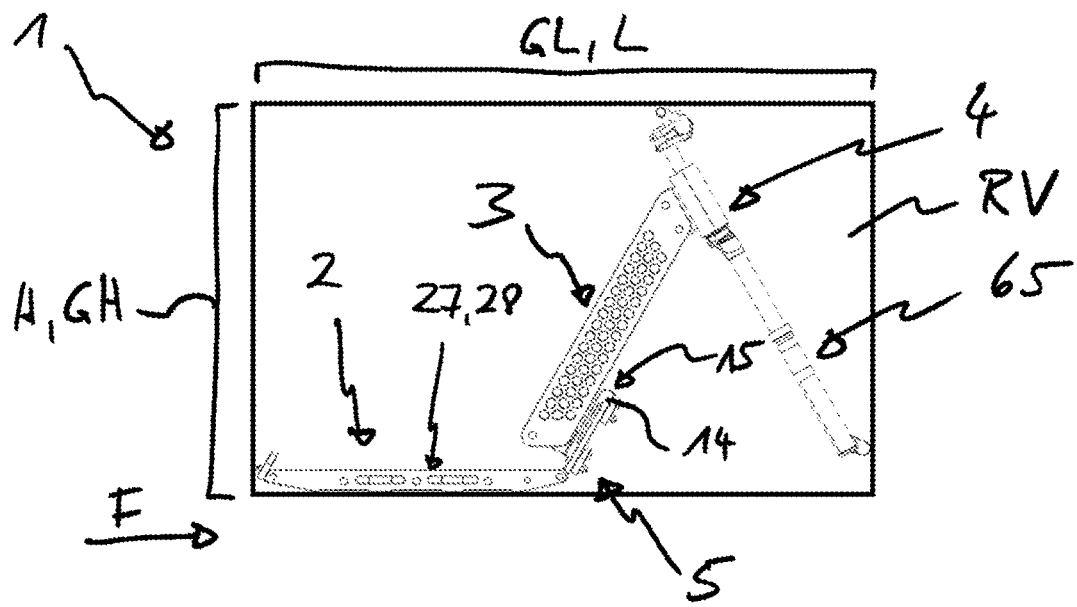
Figure 4:
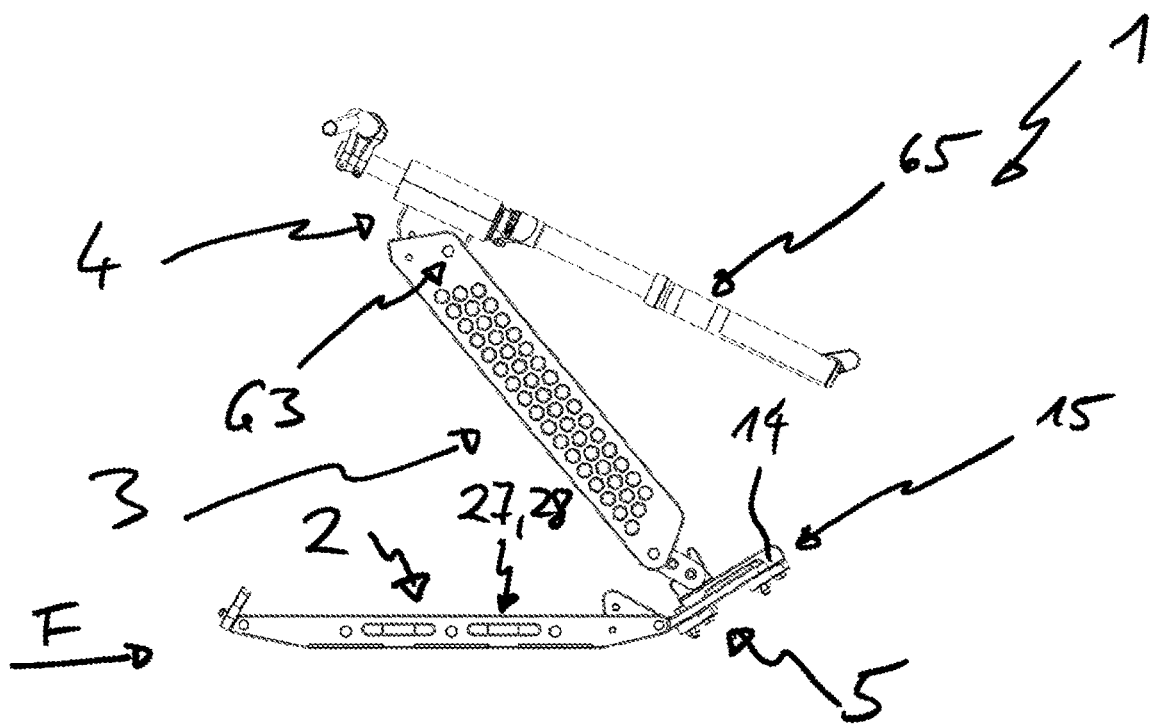
Figure 5:
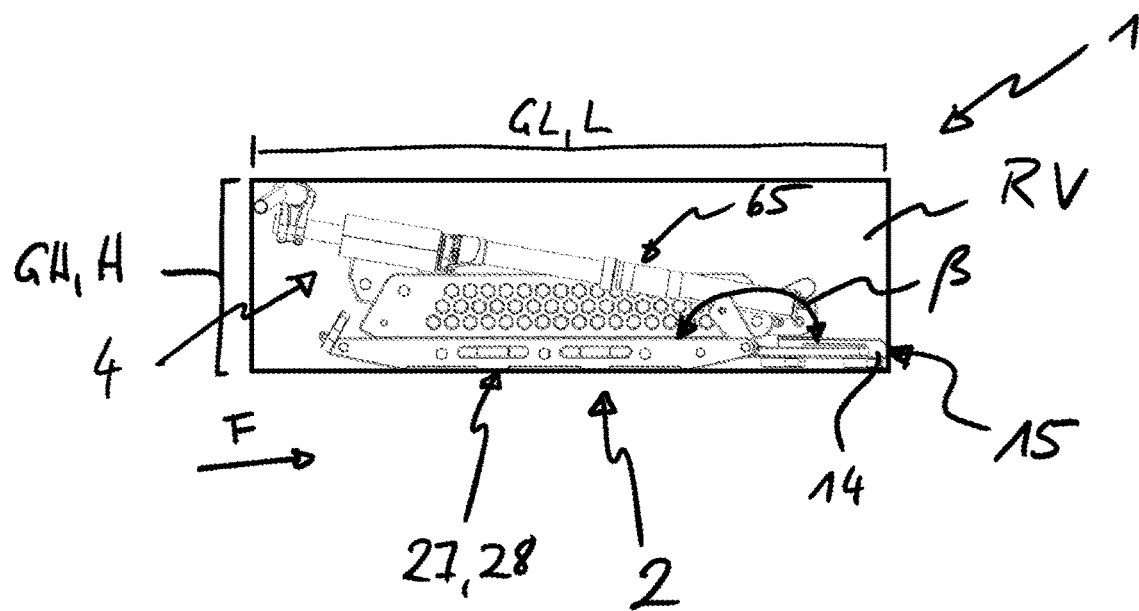
Figure 6:
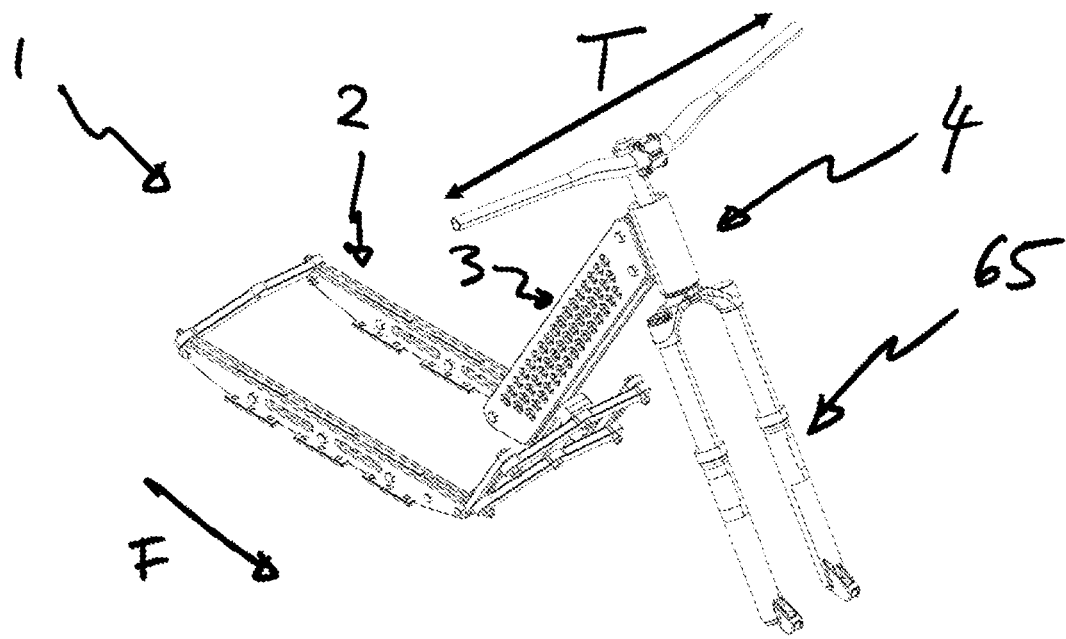
Figure 7:
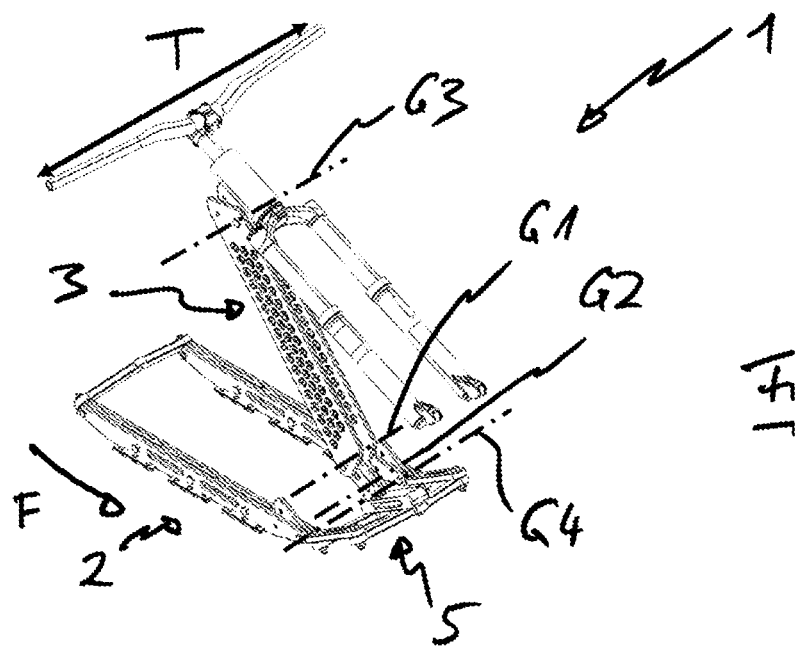
Figure 8:
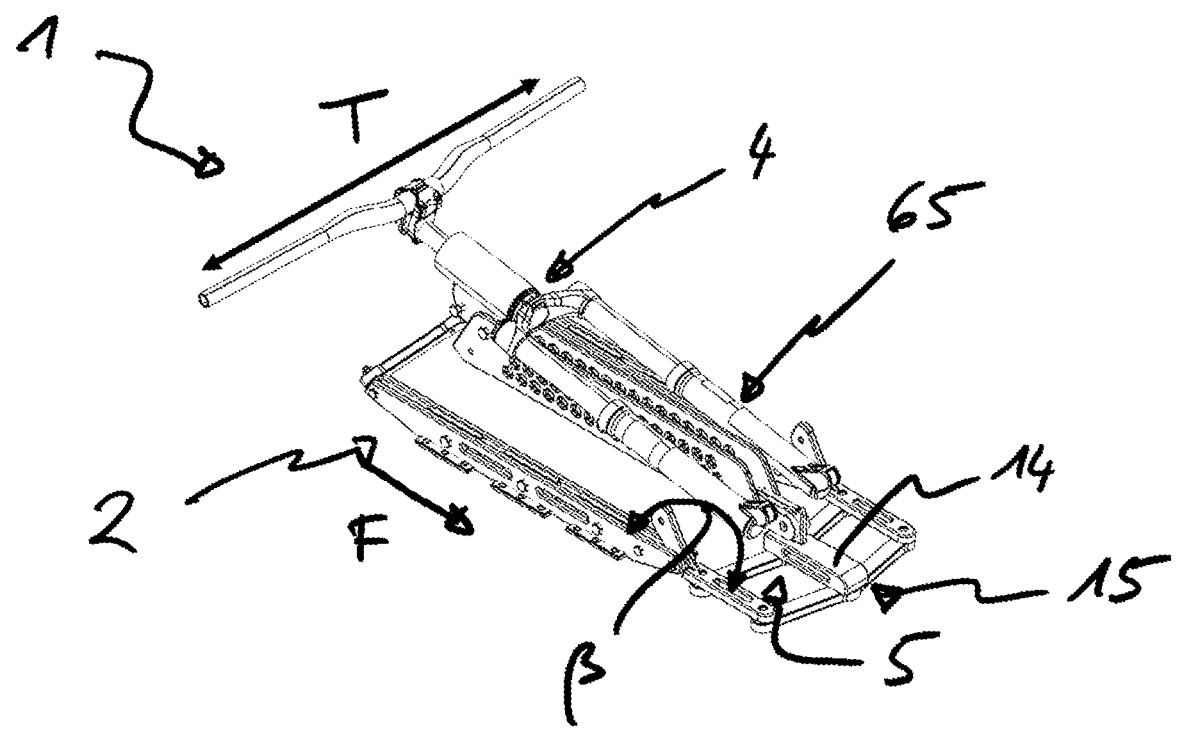
Figure 9:
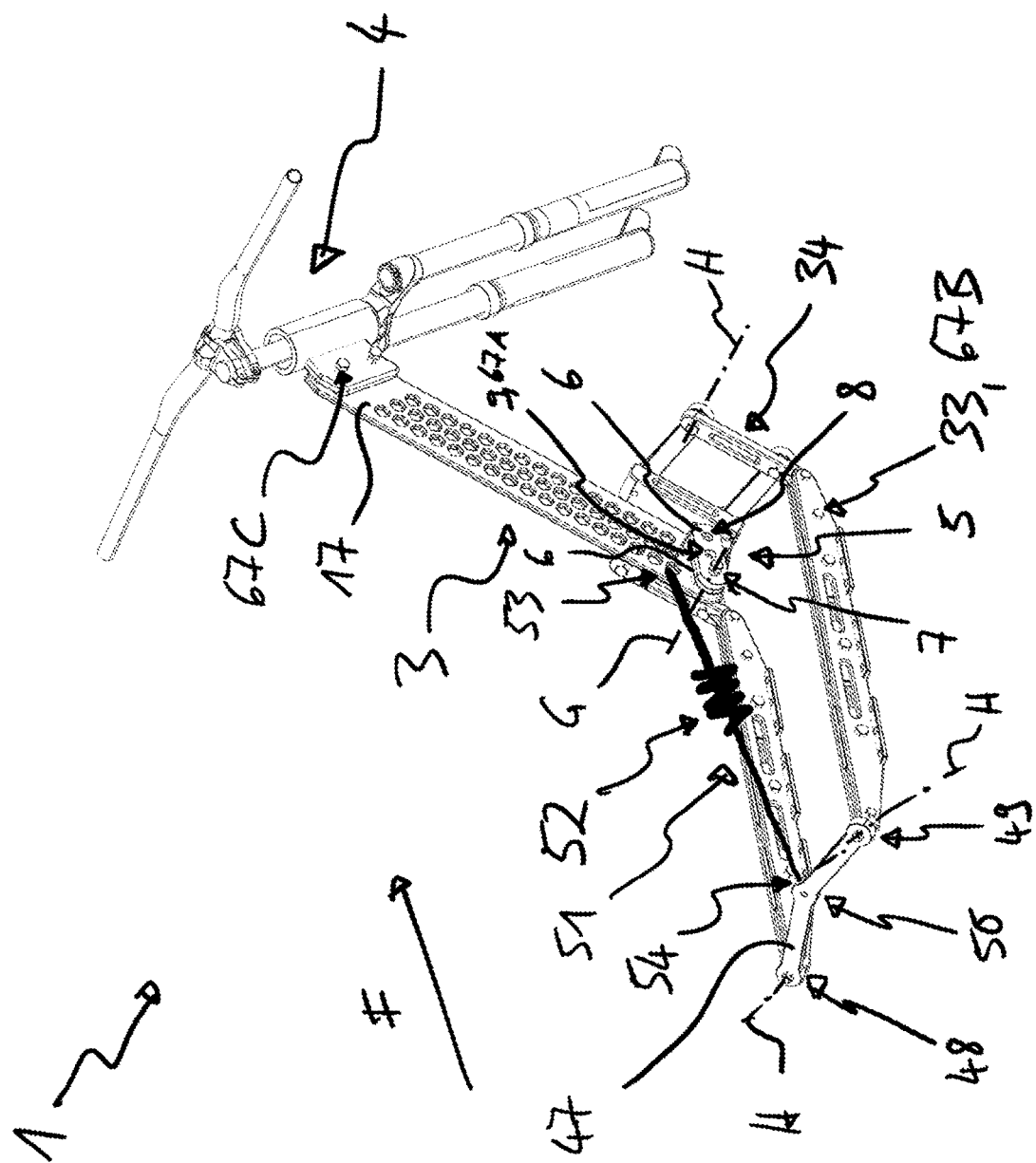
Figure 10:
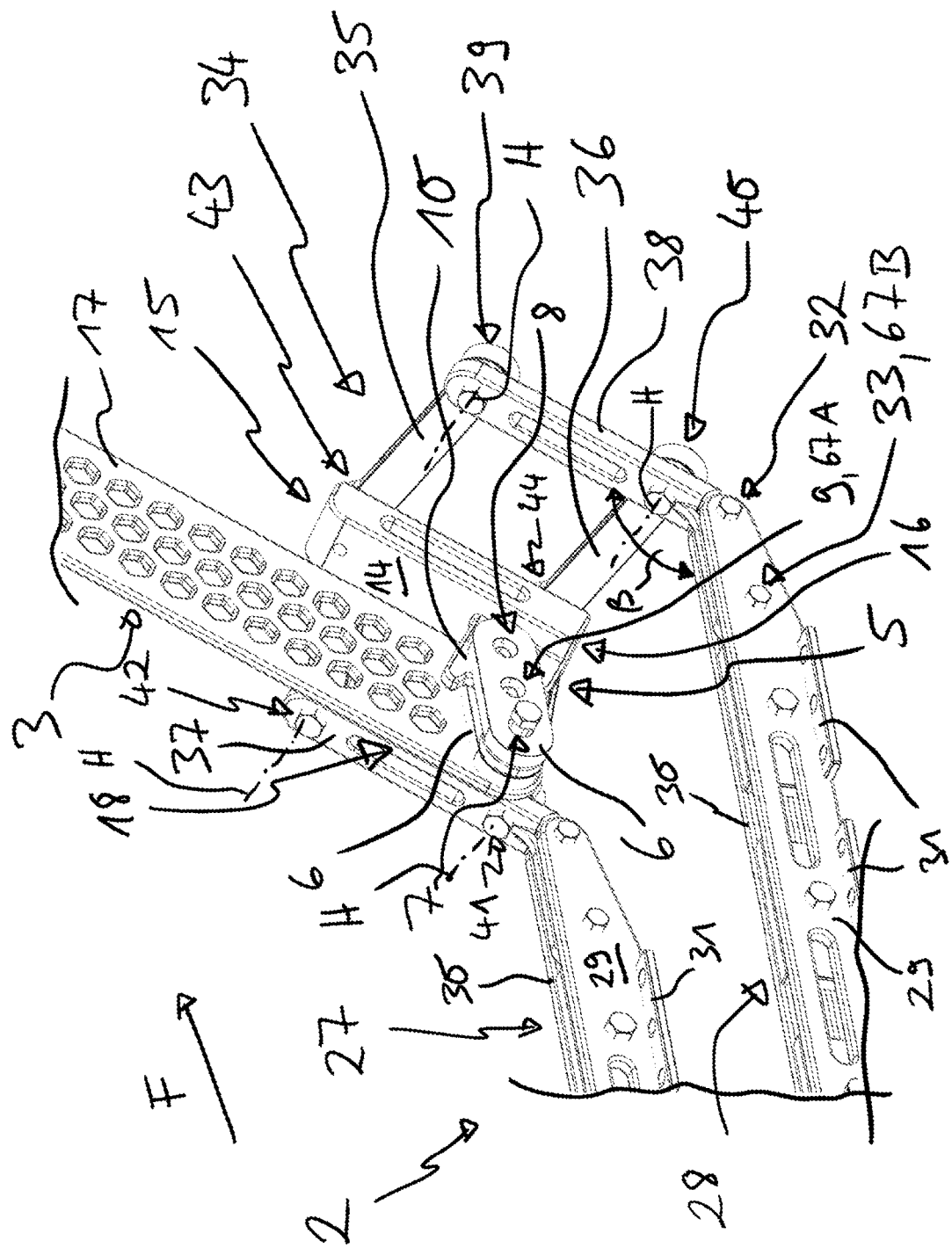
Figure 11:
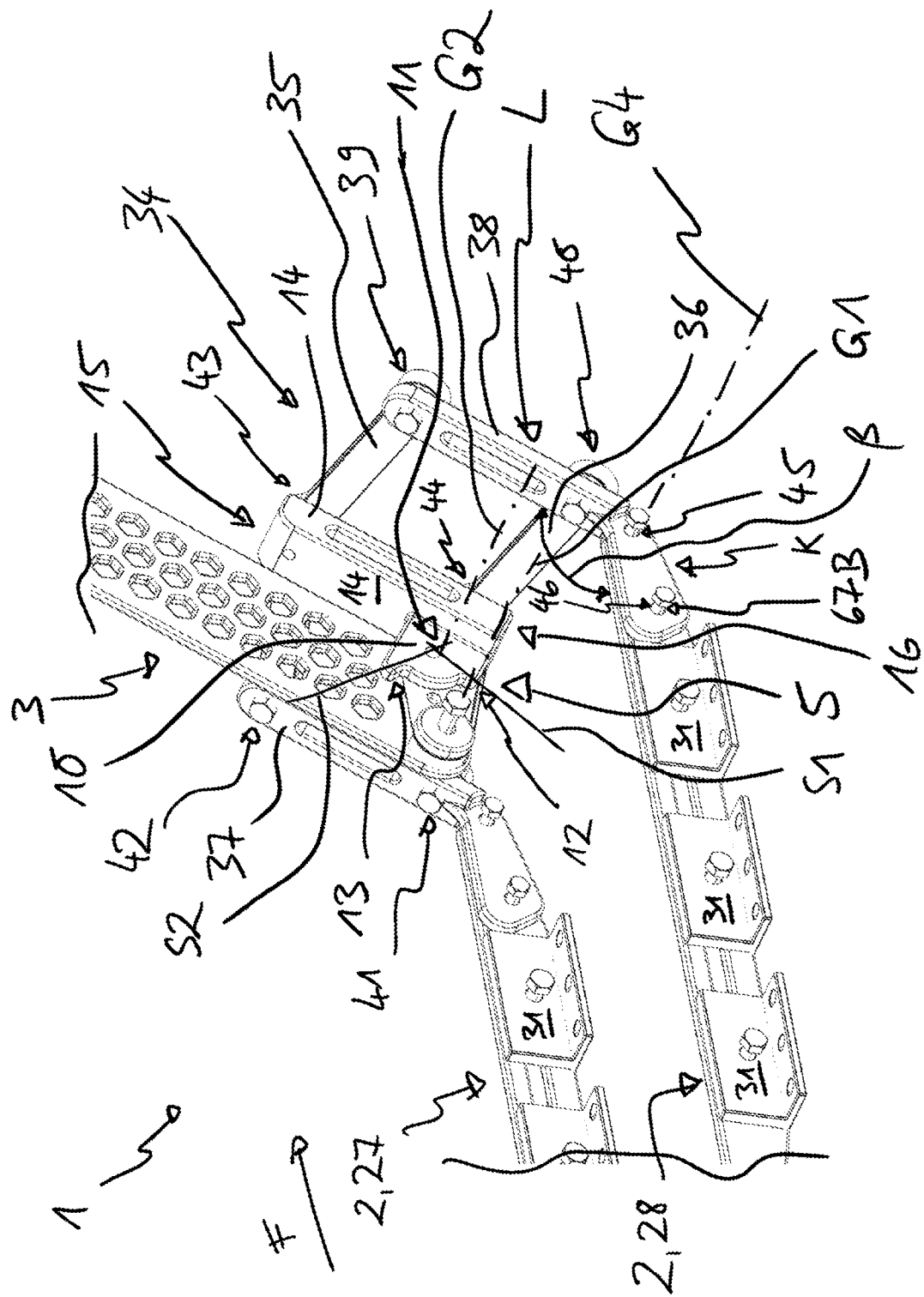
Figure 12:
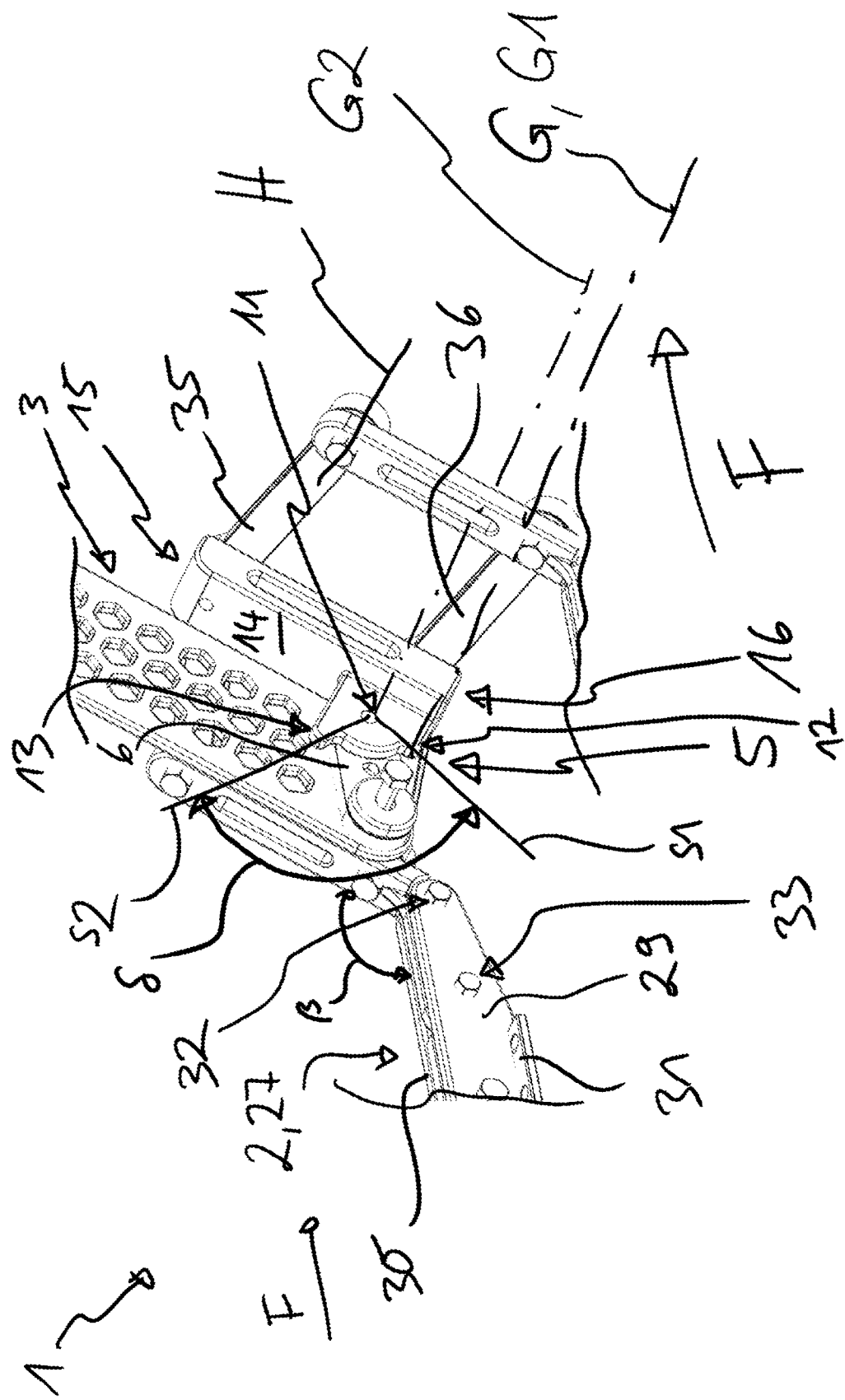
Figure 13:
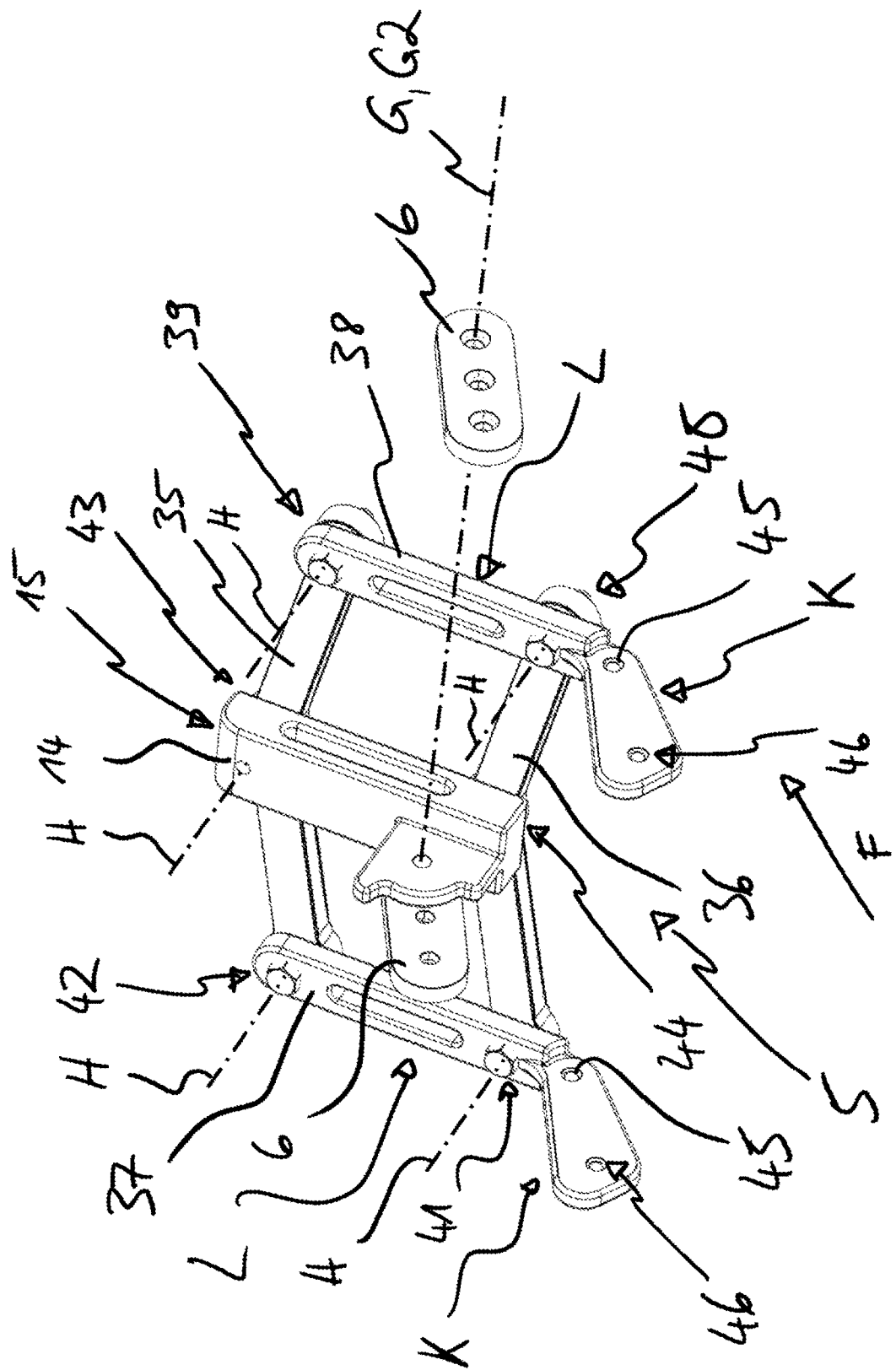
Figure 14:
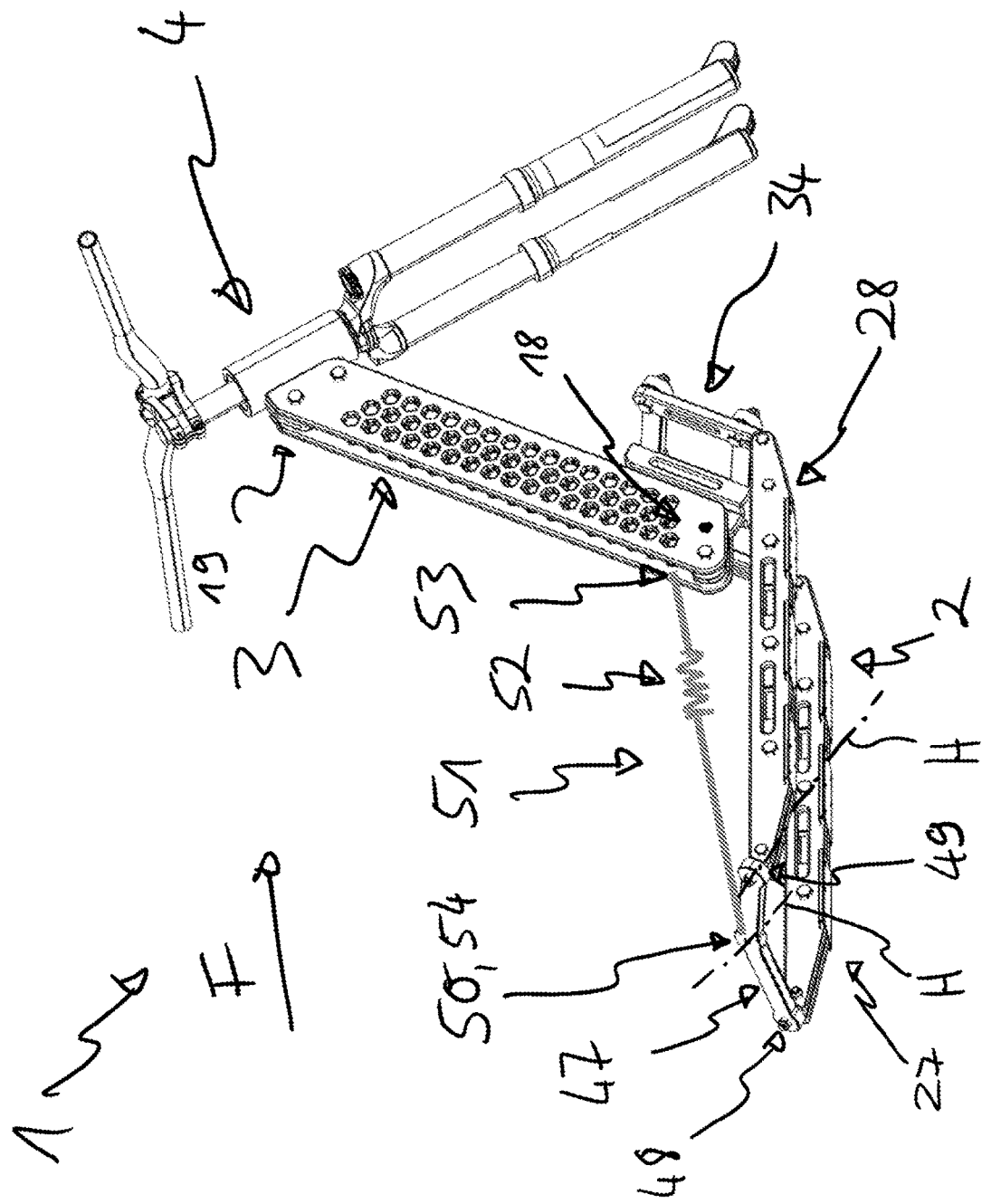
Figure 15:
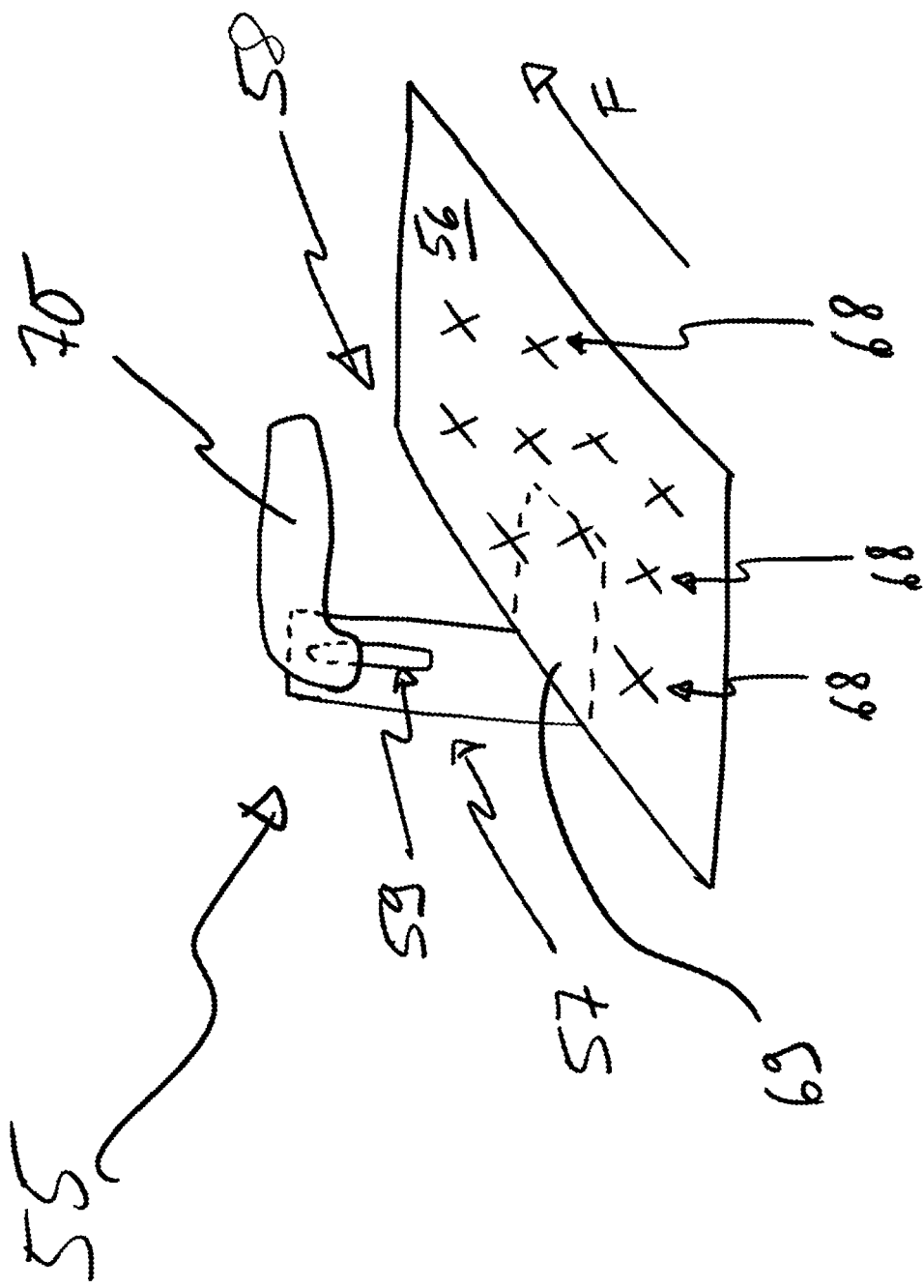
Figure 16:
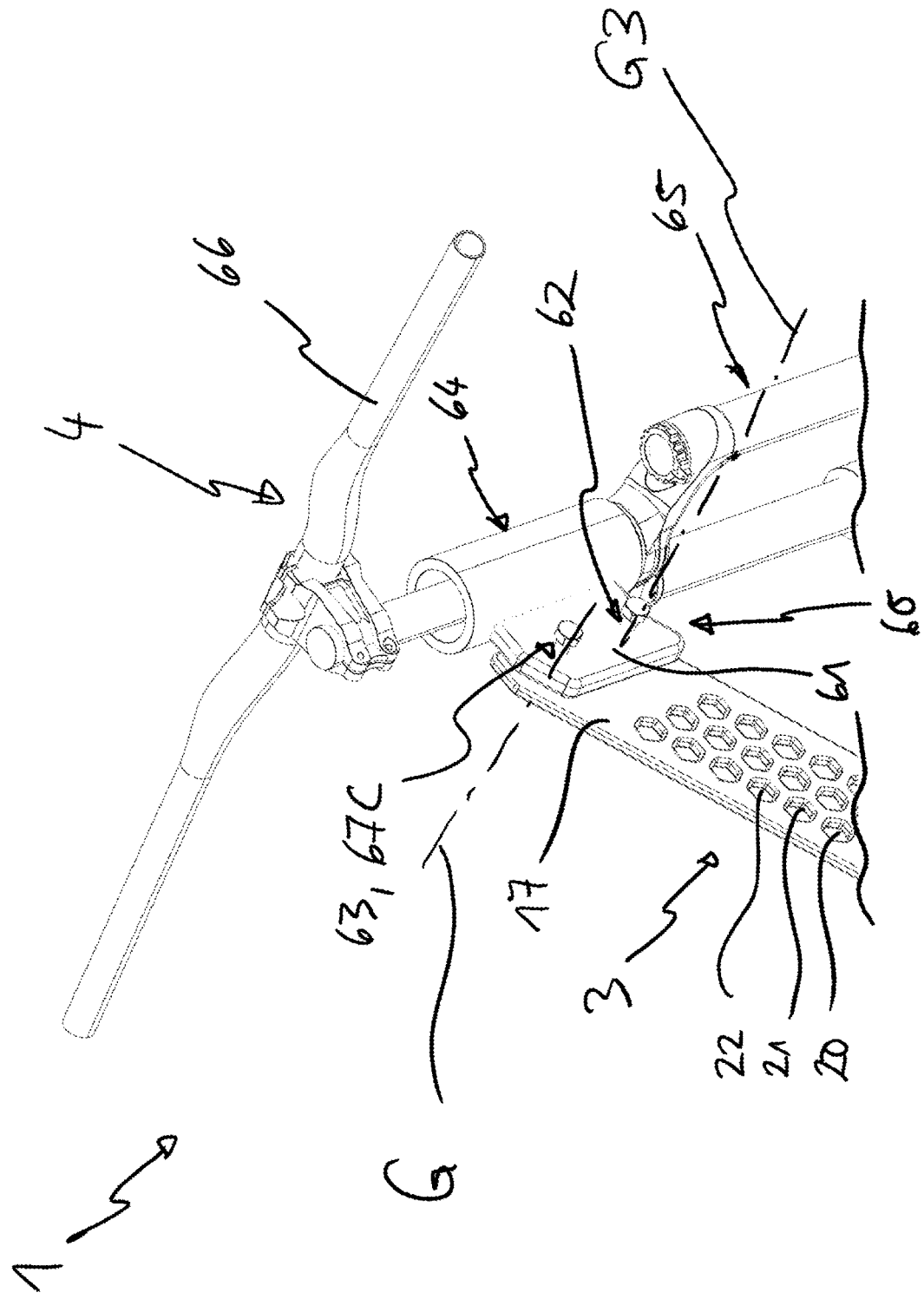
Figure 17:
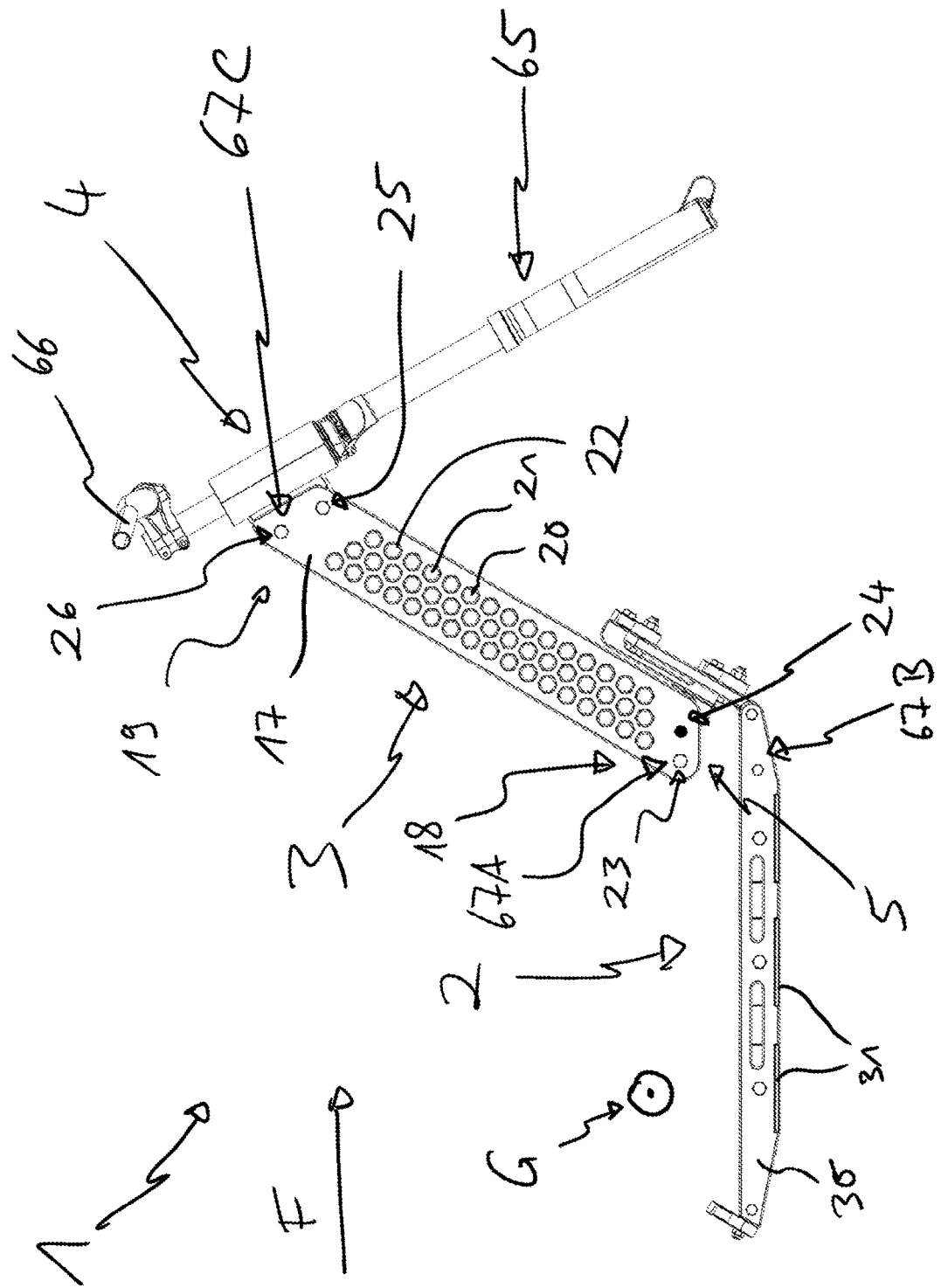
Figure 18:
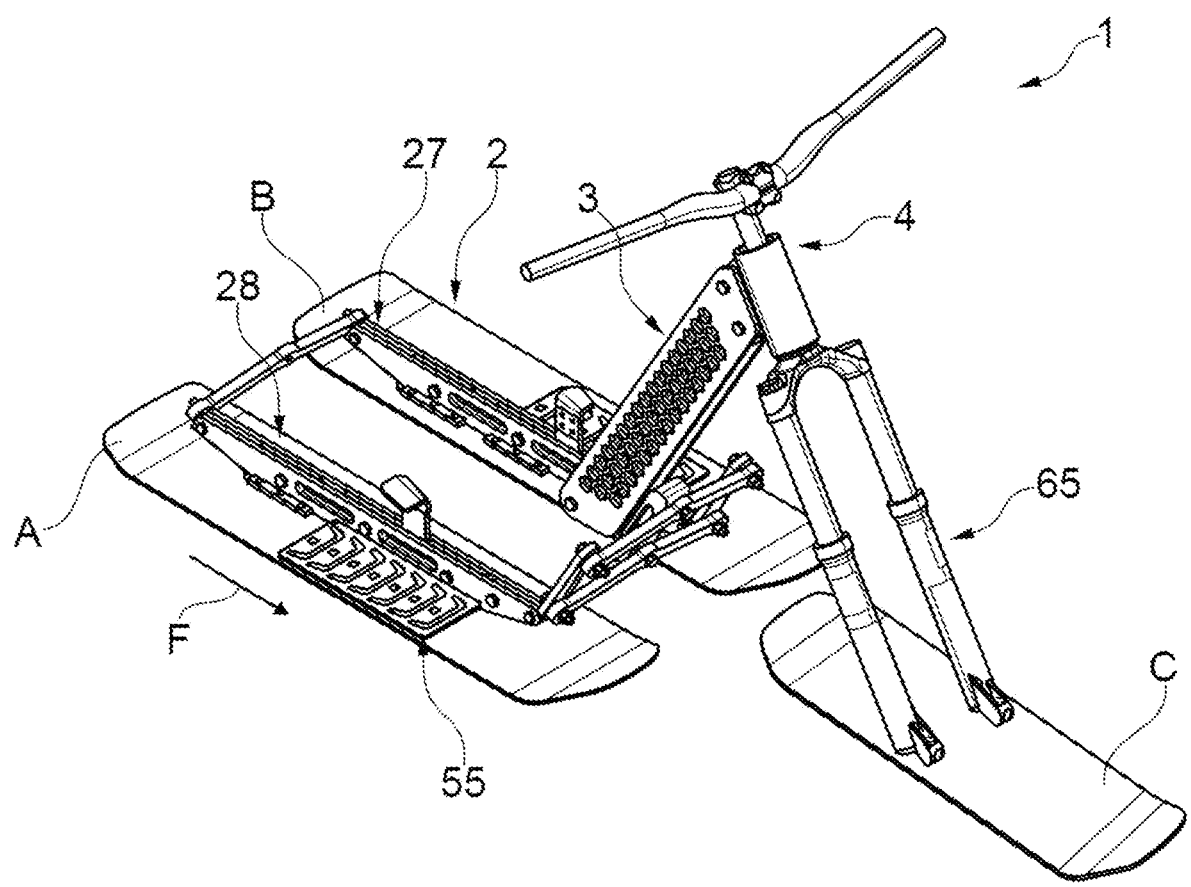
Figure 19:
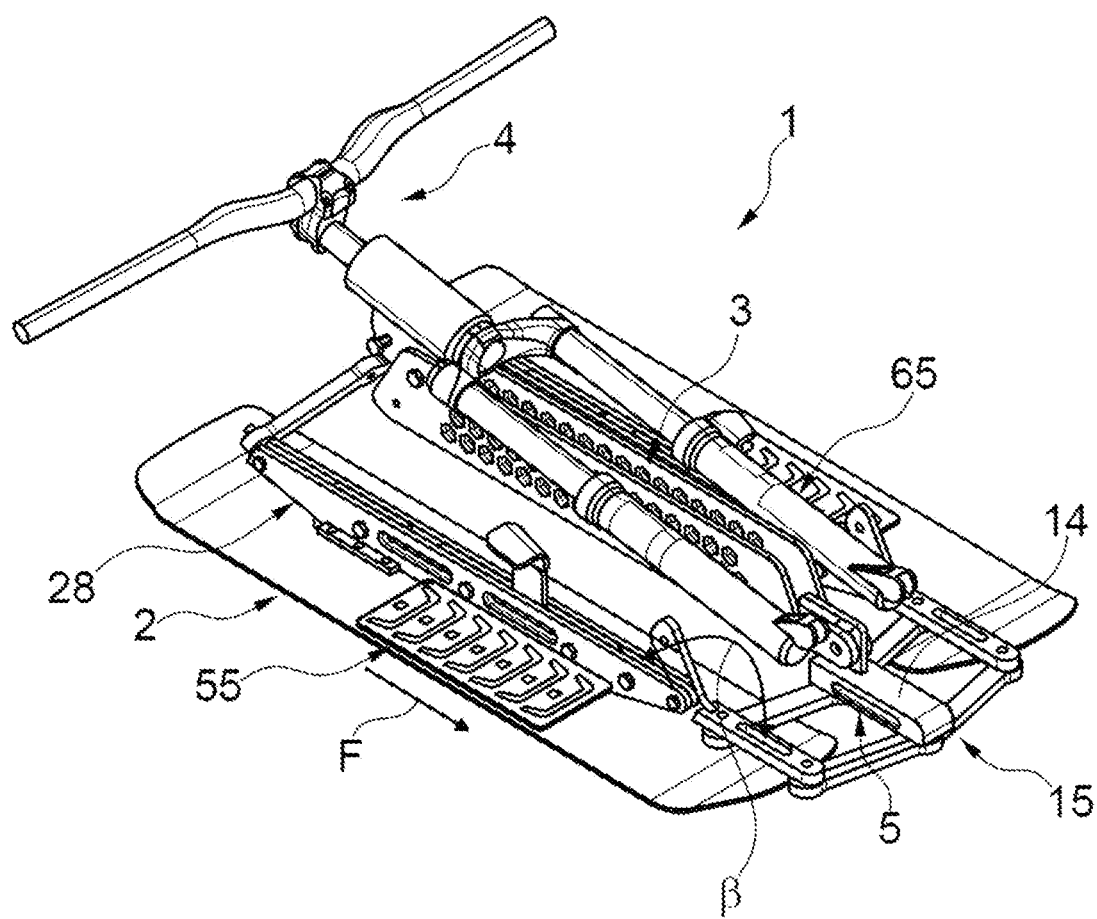
Figure 20:
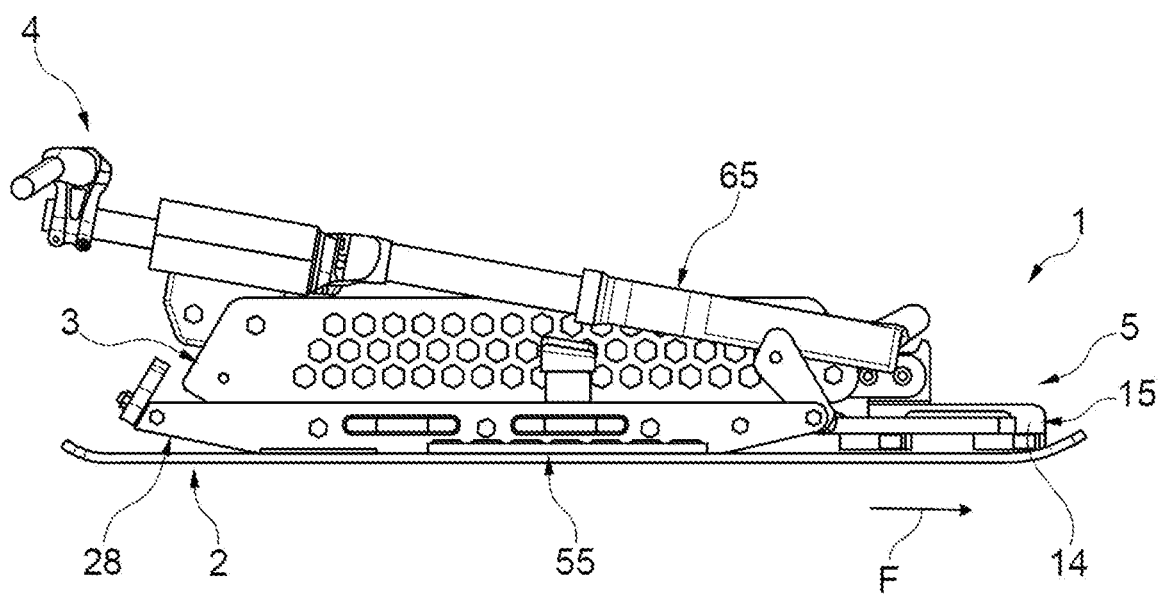

FIG. 1 shows a spatial view of a ski winter sports device;
FIG. 2 shows a top view of the ski winter sports device of FIG. 1;
FIG. 3 shows a side view of the ski winter sports device of FIG. 1 in an operating state;
FIG. 4 shows a side view of the ski winter sports device of FIG. 1 during the transition from the operating state of FIG. 1 to a transport state;
FIG. 5 shows a side view of the ski winter sports device of FIG. 1 in a transport state;
FIGS. 6 to 8 shows a spatial view of the ski winter sports device of FIGS. 3, 4 and 5, respectively, in various states;
FIG. 9 shows another spatial view of the ski winter sports device of FIG. 1, but with only one frame part;
FIG. 10 shows an enlarged view from FIG. 9;
FIG. 11 shows the same view as FIG. 10 with additional elements not shown;
FIG. 12 shows an enlarged view from FIG. 10;
FIG. 13 shows the same view as FIG. 12 but with additional elements not shown;
FIG. 14 shows a further spatial view of the ski winter sports device from FIG. 1,
FIG. 15 shows a schematic spatial view of a foot receiving device;
FIG. 16 shows an enlarged, three-dimensional view of the ski winter sports device of FIG. 1;
FIG. 17 shows a side view of the ski winter sports device of FIG. 1 in an operating state;
FIG. 18 shows a spatial view of a ski winter sports device similar to FIG. 1 which shows the relationship between the standing device and the connection/interface between the standing device and the foot receiving device;
FIG. 19 shows a spatial view of a ski winter sports device similar to FIG. 7 which shows the relationship between the standing device and the connection/interface between the standing device and the foot receiving device; and
FIG. 20 shows a spatial view of a ski winter sports device similar to FIG. 5 which shows the relationship between the standing device and the connection/interface between the standing device and the foot receiving device.

DETAILED DESCRIPTION

According to a first aspect of the present invention, a ski winter sports device, more particularly a ski trike, for downhill sliding with three arrangeable skis comprises a standing device on which a user can stand.

In the present description, the term "for downhill sliding with three arrangeable skis" can be understood as meaning that the ski winter sports device is constructed and configured to slide downhill with three skis. In other words, three skis can be arranged on the ski winter sports device in order to slide downhill with the ski winter sports device. For the sake of completeness, it is pointed out that if only two skis are arranged, the ski winter sports device may be poorly usable or not usable at all.

Two skis can be arranged on the standing device, side by side in the direction of travel, so that one ski is available for each foot of a user. The two skis can be arranged on the standing device in such a way that they are hip-width spaced.

Further, the ski winter sports device comprises a frame for connecting the standing device to a holding device for holding by hand, wherein the frame and the standing device being relatively movably connected to each other.

The frame and the standing device can be configured to be foldable relative to each other so that the required spatial volume of the ski winter sports device in particular the overall length and/or the overall height of the ski winter sports device, can be reduced.

In the present description, the term "spatial volume" can be understood to mean that a rectangular cuboid having a height, a length and a depth, is placed over the ski winter sports device, wherein the ski winter sports device contacts each surface of the cuboid. In other words, the ski winter sports device fits exactly within the spatial volume of a rectangular cuboid. In this rectangular cuboid, one side surface may be oriented parallel to the surface of the earth and ground, respectively. In this context, "spatial volume" is further understood to mean that the ski winter sports device, in an operating and/or transport state, in each state comprises a position in which it has the smallest possible volume or the smallest possible size or the smallest local requirement or the smallest space requirement. Furthermore, "spatial volume" can be understood as the product of total length, total height and/or depth, whereby the "spatial volume" in an operating state of the ski winter sports device can differ from a "spatial volume" in a transport state of the ski winter sports device. In addition, "foldable" or "folding" may be understood to mean an arrangement in which parts and/or device and/or components and/or elements are rotatably connected to each other.

Furthermore, the ski winter sports device can be configured to be transformed or transferred from a transport state to an operating state and vice versa, in particular to be transferred without tools.

In the transport state, the ski winter sports device can be transported to the place of use.

In the operating state, the ski winter sports device can be ready for use for downhill sliding.

It is also possible for the ski winter sports device to have a larger spatial volume in the operating state compared to the transport state, in particular a larger overall length and/or overall height.

In the transport state, the overall length of the ski winter sports device may be at least 15% or at least 30% less than in the operating state.

The overall length of the ski winter sports device can be formed, in the operating state and viewed in the direction of travel, by the distance from the foremost end of the frame or a holding device with or without a steering fork to the rearmost end of the standing device, in particular to the rear end of at least one mounting frame part.

The overall length of the ski winter sports device, in the transport state and viewed in the direction of travel, can be formed by the distance from an upper end of a tilting member of the standing device to the rearmost end of the standing device, in particular to the rear end of at least one mounting frame part.

Furthermore, the overall length of the ski winter sports device in the transport state and as viewed in the direction of travel can be formed from the end of the holding device which, as viewed against the direction of travel, projects beyond the rearmost end of the standing device in the operating state, in particular the rear end of mounting frame parts, to an upper end of a tilting member of a first connecting device which connects the frame to the standing device in a relatively movable manner with respect to one another.

In the transport state, the overall height of the ski winter sports device may be at least 15% or at least 30% less than in the operating state.

The overall height of the ski winter sports device may be formed by the distance from the highest end of the frame or a holding device to the ground or to at least one mounting frame part of the standing device when viewed transversely to the direction of travel in the operating state.

Also, the overall height of the ski winter sports device in the transport state, as viewed transversely to the direction of travel, can be formed by the distance from the highest end of the frame or the holding device to the ground or to at least one mounting frame part of the standing device.

In this context, total length and/or total height can be understood and determined in such a way that at least one ski or the skis or at least one mounting frame part of the standing device rests on the ground or the surface of the earth when determining them.

Further, in a transport state, the frame and the standing device may be movable toward each other, similar to rotatably interconnected levers of closing scissors or similar to a folding blade of a pocket knife, and/or away from each other, similar to rotatably interconnected levers of opening scissors or similar to a folding blade of a pocket knife.

It is also conceivable that in a transport state, in which the ski winter sports device can be transported to the place of use, the frame can be folded in the direction of the standing device or vice versa, so that the spatial volume, in particular the overall length and/or the overall height, of the ski winter sports device is reduced in comparison with the operating state.

Further, in an operating state, the frame and the standing device may be movable relative to each other within a limited angular range or within a limited range.

Throughout the description, the terms "limited angular range" and "limited range" may be used interchangeably.

In the operating state, the frame can be configured to be movable relative to the standing device within a limited angular range, so that unevenness of the ski slope during downhill sliding can be compensated for by the relative movement of the frame and the standing device within the limited angular range.

Furthermore, the ski winter sports device may be configured such that the frame and the standing device remain rotatably connected to each other beyond a limited angular range, for example, after the toolless and non-destructive release of a quick-connection device of a first connecting device, so that the ski winter sports device can be transferred from the operating state to the transport state and vice versa by moving the frame relative to the standing device.

Additionally or alternatively, the ski winter sports device may be configured, particularly in the operating condition, such that the frame and the standing device are rotatably connected to each other within a limited angular range, for example, after the toolless and releasable installation of a quick-connection device of a first connecting device, so that, by moving the frame relative to the standing device, unevenness of the ski slope during downhill sliding can be compensated for by the relative movement of the frame and the standing device within the limited angular range, wherein it is not possible to transfer from the operating state to the transport state and vice versa by moving the frame relative to the standing device.

It is also conceivable that the limited angular range allows relative rotational movement between 15 and 30 degrees from the frame to the standing device.

Further, the limited angular range may allow relative rotational movement between 15 and 30 degrees, from a frame component of the frame to a frame member of the standing device or to a mounting frame part of the standing device.

Further, the ski winter sports device may be configured such that the frame and the standing device together have an L-shape in the operating condition, similar to a hockey stick. Thus, in the operating condition the frame and the standing device together may include an angle between 100 and 150 degrees or a 135 degree angle. Such an angle allows for an ergonomic posture on the ski winter sports device.

A second aspect of the present invention comprises a ski winter sports device, more particularly a ski trike, for downhill sliding with three arrangeable skis.

It is noted that the features of the ski winter sports device as mentioned in the second aspect may individually or in combination apply to the ski winter sports device according to the first aspect.

Also, the features mentioned above under the first aspect of the invention may be combined with the features according to the second aspect of the invention.

Thus, a ski winter sports device, more particularly a ski trike, for downhill sliding with three arrangeable skis, in particular according to the first aspect, can have a holding device for holding by hand, or to which a user can hold on, wherein a ski can be arranged on the holding device.

Further, the ski winter sports device may include a frame for connecting the holding device to a standing device on which a user may stand.

In addition, the frame and the holding device can be configured to be foldable relative to each other so that the required spatial volume of ski winter sports device, in particular the overall length and/or the overall height of the ski winter sports device, can be reduced.

Further, the ski winter sports device may be foldable about at least one axis oriented perpendicular to the direction of travel of the ski winter sports device.

It is conceivable that the frame and the standing device can be folded and/or moved about at least one horizontal axis that is aligned transversely to the direction of travel.

Also, the frame and the holding device can be foldable and/or movable about at least one horizontal axis that is oriented transversely to the direction of travel.

Furthermore, it is possible that in a transport state the frame and the holding device are movable towards each other, similar to rotatably interconnected levers of a closing pair of scissors or similar to a folding blade of a pocket knife, and/or movable away from each other, similar to rotatably interconnected levers of an opening pair of scissors or similar to a folding blade of a pocket knife.

In a transport state, in which the ski winter sports device can be transported to the place of use, the holding device can be folded in the direction of the frame or vice versa, so that the spatial volume, in particular the overall length and/or the overall height, of the ski winter sports device is reduced compared to an operating state in which the ski winter sports device is ready for use for downhill sliding.

Also, the ski winter sports device may be configured such that the frame and the holding device together have an upside-down V-shaped configuration when in the operating state.

In the operating state, the frame and the holding device can be configured to be rotationally rigid with respect to each other about at least one horizontal axis oriented transversely to the direction of travel.

In the transport state, the frame and the holding device can be configured to rotate relative to each other about at least one horizontal axis oriented transversely to the direction of travel.

Furthermore, the ski winter sports device can be configured in such a way that the frame and the holding device remain rotatably connected to one another, for example, after a quick-connection device of a second connecting device has been released without tools and without destruction, so that the ski winter sports device can be transferred from the operating state to the transport state and vice versa by moving the holding device relative to the frame.

Furthermore, the ski winter sports device may be configured such that the frame and the holding device are rotationally rigidly connected to each other, for example, after the toolless and releasable installation of a quick-connection device of a second connecting device, so that a transfer from the operating state to the transport state and vice versa is not possible by moving the frame relative to the holding device.

A third aspect of the present invention comprises a ski winter sports device, more particularly a ski trike, for downhill sliding with three arrangeable skis.

It is expressly noted that the features as mentioned in the third aspect of the invention may individually or in combination apply to the first and/or second aspect.

Also, the features mentioned above under the first and/or second aspect of the invention may be combined with the features according to the third aspect of the invention.

Thus, according to the first and/or second aspect, a ski winter sports device, more particularly a ski trike, for downhill sliding with three arrangeable skis may comprise a holding device for holding by hand, wherein a ski is arrangeable on the holding device.

In addition, the holding device may include a head tube element for receiving a steerer tube of a steering fork.

The head tube element may allow relative rotation of the steerer tube and the frame to achieve a change in direction for a ski on the holding device with the aid of a rotation of the steering fork.

The holding device for holding may comprise a handlebar and a steering fork, in particular a bicycle fork.

The holding device and the frame can be configured so that the handlebar can be rotated relative to the frame so that the direction of a ski on the holding device can be changed in its direction.

Also, the ski winter sports device can comprise a standing device on which a user can stand, wherein two skis can be arranged on the standing device, which can be arranged next to each other in the direction of travel, so that one ski is available for each foot of a user.

Further, the ski winter sports device may include a frame for connecting the holding device to the standing device, the frame and the standing device being relatively movably connected to each other.

In addition, both the frame and the standing device can be configured to fold relative to one another and the frame and the holding device can be configured to fold relative to one another, so that the required spatial volume of the ski winter sports device, in particular the overall length and/or the overall height of the ski winter sports device, can be reduced.

Further, the ski winter sports device may include a first connecting device for connecting the frame to the standing device for relative movement with respect to each other.

The first connecting device can be configured to enable a relative movement of the frame and the standing device with respect to each other, in particular to increase and/or decrease the relative movement, but in particular not to prevent the relative movement.

Also, the first connecting device may articulately connect the frame and the standing device.

Furthermore, the frame and the standing device may be connected to each other, in particular exclusively, via the first connecting device.

It is also conceivable that the frame is arranged, in particular exclusively, on the first connecting device.

Furthermore, it is possible that the standing device is arranged, in particular exclusively, on the first connecting device.

Furthermore, the first connecting device can be configured to limit the relative movement of the frame and the standing device with respect to each other in an operating state in which the ski winter sports device is ready for use for downhill sliding, such that they can be moved relative to each other within a limited range, in particular within a limited angular range, and thus to ensure safe downhill sliding.

It is also conceivable, in an operating state in which the ski winter sports device is ready for use for downhill sliding, to limit the relative movement of the frame and the standing device with respect to one another in such a way that they can be moved relative to one another within a limited range, in particular within a limited angular range, and thus to ensure safe downhill sliding.

It is also possible that the limited range, in particular the limited angular range, allows a movement between 2 and 5 cm, in particular a rotational movement between 15 and 30 degrees, from the frame to the standing device.

Furthermore, it is also possible that the limited range, in particular the limited angular range, allows a movement between 2 and 5 cm, in particular a rotational movement between 15 and 30 degrees, from a frame component of the frame to a frame member of the standing device or to a mounting frame part of the standing device.

Furthermore, it is conceivable, in a transport state in which the ski winter sports device can be transported to the place of use, to increase the relative movement of the frame and the standing device in such a way that, by folding the frame and the standing device relative to one another, in particular as seen in the direction of travel, the spatial volume of the ski winter sports device, in particular the overall length and/or the overall height of the ski winter sports device, can be reduced in comparison to an operating state.

Furthermore, the first connecting device can be configured to increase the relative movement of the frame and the standing device in a transport state, in which the ski winter sports device can be transported to the place of use, in such a way that by folding the frame and the standing device relative to one another, in particular as seen in the direction of travel, the spatial volume of the ski winter sports device, in particular the overall length and/or the overall height of the ski winter sports device, can be reduced in comparison to the operating state.

It is further conceivable, in a transport state in which the ski winter sports device is transportable to the place of use, to increase the relative movement of the frame and the standing device such that they are movable relative to one another beyond a limited range or a limited angular range and thus the spatial volume of the ski winter sports device, in particular the overall height and/or the overall length of the ski winter sports device, can be reduced compared to an operating state.

It is also possible that the first connecting device is configured to increase the relative movement of the frame and the standing device in a transport state in which the ski winter sports device can be transported to the place of use, such that they can be moved relative to one another beyond the limited range and thus the spatial volume of the ski winter sports device, in particular the overall height and/or the overall length of the ski winter sports device, can be reduced compared to the operating state.

Also, the first connecting device can be arranged on the frame and/or on the standing device, in particular directly.

Moreover, it is conceivable that the first connecting device is configured to fold and/or move the frame and the standing device about at least one horizontal axis that is oriented transversely to the direction of travel.

Furthermore, in a transport state, a relative movement of the frame towards the standing device can be enlarged, for example with the aid of the first connecting device, in such a way that the frame and the standing device, similar to rotatably interconnected levers of a closing pair of scissors or similar to a folding blade of a pocket knife, are configured to be foldable, as a result of which the required spatial volume of the ski winter sports device, in particular the overall height and/or the overall length of the ski winter sports device, can be reduced compared to the operating state.

Furthermore, in the operating state, a relative movement of the frame towards the standing device can be reduced, for example with the aid of the first connecting device, in such a way that the first connecting device prevents folding, while still ensuring safe downhill sliding.

It may also be possible that, in the operating state, a relative movement of the frame towards the standing device can be reduced or minimized, for example with the aid of the first connecting device, in such a way that a movement of the frame relative to the standing device via the first connecting device can be limited at least for the most part, in particular to a limited angular range.

In this case, the limited angular range may allow a rotational movement between 15 and 30 degrees, from the frame to the standing device.

In addition, the limited angular range may allow rotational movement between 15 and 30 degrees, from a frame component of the frame to a frame member of the standing device or to a mounting frame part of the standing device.

Furthermore, the first connecting device may be configured to allow movement and/or folding of the frame relative to the standing device.

When folding, the frame can be moved within a larger angular range relative to the standing device than when moving. When moving, the angular range or limited angular range may be less than the angular range when folding, for example less than or equal to 50%.

In this context, the first connecting device may comprise at least one first connecting element having a first pivot point, formable into a swivel joint, to which the frame is rotatably attached, in particular in the transport state, for example, only in the transport state.

Also, the first connecting device may include at least a first connection member having a second pivot point, formable into a swivel joint, to which the first connecting element is rotatably attached to a second connecting element of the first connecting device.

Further, the first and second pivot points may be located at opposite ends of the first connecting element.

Also, the first and/or second pivot points may form part of a swivel joint.

Furthermore, it is possible that the first connecting element comprises a junction to the frame, in particular between the first and second pivot points, in order to prevent relative movement between the frame and the first connecting element about the first pivot point with the aid of a toolless, non-destructive, releasably fastenable quick-connection device.

In addition, it can be provided that the junction for a toolless, non-destructive, releasably fastenable quick-connection device is formed as a feedthrough through the first connecting element.

It is also possible for the junction to be adapted to a toolless, non-destructive, releasably fastenable quick-connection device in terms of shape and fit, in particular configured as a clearance fit or as a transition fit.

Furthermore, it is possible that the first connecting device comprises a second connecting element having a pivot point, formable into a swivel joint, to which a first connecting element of the first connecting device is rotatably attached.

Further, it may be provided that the pivot point of the second connecting element is rotatably connected to the second pivot point of the first connecting element to form a swivel joint.

In this case, the pivot point of the second connecting element may be arranged within the second connecting element.

In addition, the second connecting element may include first and second end stops for a tool-less, non-destructively releasably fastenable quick-connection device.

Also, it is possible for the first and second end stops to be spaced apart to limit relative movement of a first connecting element of the first connecting device with respect to the second connecting element.

Furthermore, it is conceivable that a first leg, formed by a line between the first end stop and the pivot point of the second connecting element, and a second leg, formed by a line between the second end stop and the pivot point of the second connecting element, enclose an angle of between 60 and 120 degrees, in particular of 100 degrees.

Each end stop may be formed as a nose projecting from the second connecting element.

Furthermore, each end stop can be adapted in terms of its shape to a toolless, non-destructively releasable quick-connection device to ensure non-destructive slinging.

Furthermore, the second connecting element between the first and second end stop can comprise a curved path, for example, a circular path, and in particular be disc-shaped.

In addition, the first connecting device may include a tool-less, non-destructively releasably fastenable quick-connection device for slinging against at least one end stop of a second connecting element and limiting relative movement between first and second connecting elements of the first connecting device.

It is also possible that the quick-connection device is configured to connect the first connecting element to the frame, in particular to releasably fasten the first connecting element to the frame without tools and in a non-destructive manner. In this way, rotation of the at least one first connecting element relative to the frame about the first pivot point of the at least one first connecting element can be prevented.

Furthermore, the quick-connection device can be adapted to a junction of a first connecting element of the first connecting device with respect to shape and fit, in particular formed as a clearance fit or as a transition fit.

In the operating condition, the quick-connection device may be disposed in the junction of the first connecting element to prevent rotation of the first connecting element relative to the frame about the first pivot point of the first connecting element.

In the transport state, the quick-connection device may be removed from the junction of the first connecting element, allowing rotation of the first connecting element relative to the frame about the first pivot point of the first connecting element.

Furthermore, it can be provided that the first connecting device comprises a tilting member which is configured to tilt transversely to a direction of travel according to the inclination of the standing device, in particular its two arrangeable skis or the inclination of the mounting frame parts of the standing device.

In addition, it is possible that the first connecting device comprises a tilting member which is connected to a parallelogram guide so that transversely to a direction of travel the inclination of the standing device or the inclination of the mounting frame parts of the standing device, in particular its two arrangeable skis, can be transferred to the tilting member or can be synchronized with the tilting member.

Further, the tilting member may include an upper end and a lower end.

A second connecting element of the first connecting device may be rotatably attached to the lower end of the tilting member.

The lower end and the upper end may each be connected to a first component and/or to a second component of a parallelogram guide, in particular rotatably.

The first or second component of the parallelogram guide may be aligned in parallel at the lower end with the second or first component of the parallelogram guide at the upper end.

The tilting member of the first connecting device and the second connecting element of the first connecting device may be integrally formed or formed from a single part.

Furthermore, the first connecting device, in particular its at least one first and/or second connecting element, may be formed from a sheet of metal whose width and length are much greater than its thickness.

Also, the first connecting device may be or may have been created using a stamping process, a laser cutting process, a milling process, and/or a cutting process.

A fourth aspect of the present invention includes a frame of a ski winter sports device and for connection to a support and/or for connection to a standing device of a ski winter sports device.

It is expressly noted that the features as mentioned in the fourth aspect of the invention may apply, individually or in combination, to the first, second and/or third aspects.

Also, the features mentioned above under the first, second and/or third aspect of the invention may be combined with the features according to the fourth aspect of the invention.

A frame of a ski winter sports device, in particular according to any one of the preceding claims, and for connection to a holding device and/or for connection to a standing device of a ski winter sports device may comprise a frame component having a first end and a second end, wherein a standing device is arrangeable at the first end.

Furthermore, a holding device can be arranged at the second end.

The frame component may include multiple recesses as a lightweight measure.

Also, the frame component may be formed from a sheet of metal whose width and length are much greater than its thickness.

The recesses may have a round, oval and/or angular shape, particularly a hexagonal shape or an octagonal shape.

Furthermore, the recesses may be in the form of a honeycomb structure.

The first end may include a pivot point to which the first connecting device of the ski winter sports device is rotatably attached.

Further, the first end may comprise a pivot point, formable into a swivel joint, at which the frame component is pivotally connected to the first pivot point of the first connecting element of the first connecting device, for example, to form a swivel joint.

In addition, it may be provided that the frame component at its first end includes a first junction to the first connecting device to prevent relative movement of the frame and a first connecting element of the first connecting device about the pivot point with the aid of a tool-less, non-destructively releasably fastenable quick-connection device.

Also, the second end may include a rotational point to which the holding device of the ski winter sports device may be rotatably attached.

In addition, the frame component may include at its second end a second junction to the holding device to prevent relative movement of the frame and the holding device about the rotational point with the aid of a tool-less, non-destructively releasably fastenable quick-connection device.

The rotational point and the second junction may be spaced apart.

The second junction can be adapted to a toolless, non-destructively releasable quick-connection device in terms of shape and fit, in particular configured as a clearance fit or as a transition fit.

Further, two frame components spaced apart from each other may be provided to receive therebetween a third connecting element for connection to the holding device and/or a first connecting device for connecting the frame to the standing device for relative movement with respect to each other.

Furthermore, each frame component may be formed from a sheet of metal whose width and length are much greater than its thickness.

Also, each frame component may be or have been created using a stamping process, a laser cutting process, a milling process, and/or a cutting process.

A fifth aspect of the present invention comprises a standing device of a ski winter sports device on which a user can stand.

It is expressly noted that the features as mentioned in the fifth aspect of the invention may apply, individually or in combination, to the first, second, third and/or fourth aspect.

Also, the features mentioned above under the first, second, third and/or fourth aspect of the invention may be combined with the features according to the fifth aspect of the invention.

Thus, a standing device of a ski winter sports device, in particular a ski winter sports device according to any of the preceding aspects, on which a user may stand, may comprise at least one mounting frame part for arranging a foot receiving device and/or a ski.

The at least one mounting frame part can be oriented in the direction of travel, or be oriented the same as the direction of travel.

The at least one mounting frame part can have at least one frame member to which a connecting component for a foot receiving device and/or for a ski can be attached.

Further, the at least one mounting frame part may include at least one connecting component that is fastenable to a frame member and/or to a ski and/or to a foot receiving device.

The at least one connecting component may have a T-section formed by two flanges.

Furthermore, it is possible that a ski or a foot receiving device can be attached to one flange of the T-section, which is located at the end of the other flange centrally and transversely to the other flange.

The at least one frame member may be attached to the other flange of the T-section, the end of which is located on the one flange.

The at least one frame member may be formed from a sheet of metal having a width and length much greater than its thickness.

Each frame member may be or may have been created using a stamping process, a laser cutting process, a milling process, and/or a cutting process.

Furthermore, the at least one frame member can be arranged on a third or fourth component of a parallelogram guide of the standing device, for example, rotatably.

The parallelogram guide can synchronize the inclination of the mounting frame parts and thus associated arrangeable skis transverse to a direction of travel.

Further, relative to the direction of travel of the ski winter sports device, the at least one mounting frame part may include a front end and a rear end.

The at least one mounting frame part, in particular its at least one frame member, can comprise, in particular at the front end, a rotational point, formable into a swivel joint, about which the third or fourth component of a parallelogram guide of the standing device is arranged rotatably, in particular is fastened rotatably.

At the front end, a quick-connection point, formable into a swivel joint, can be arranged to a parallelogram guide, in particular its third and/or fourth component, in order to prevent the relative movement of the third and/or fourth component to the mounting frame part or to its at least one frame member about a rotational point of the at least one mounting frame part with the aid of a quick-connection device which can be fastened without tools and in a non-destructive manner.

In this case, the mounting frame part or its at least one frame member can have the quick-connection point.

In addition, the quick-connection point can be formed as a feedthrough through the at least one frame member.

The quick-connection point can be adapted in terms of shape and fit, in particular configured as a clearance fit or as a transition fit, to a quick-connection device that can be fastened without tools and in a non-destructively releasable manner.

The at least one mounting frame part can have two frame members between which at least one connecting component, in particular a flange thereof, is arranged, to which a ski and/or to which a foot receiving device can be attached.

Further, the at least one mounting frame part may include two frame members spaced apart such that at least one connecting component and/or a third or fourth component of a parallelogram guide may be disposed between them.

Furthermore, the standing device can have two mounting frame parts, in particular a first and a second mounting frame part, each with two frame members, between which in each case at least one connecting component and/or a third or fourth component of the parallelogram guide can be arranged, wherein a ski can be fastened to the at least one connecting component and/or to which a foot receiving device can be fastened.

The mounting frame parts can be aligned in the same direction, in particular parallel to each other.

A ski and/or a foot receiving device and/or a third or fourth component of the parallelogram guide may be fastenable to each mounting frame part so that a ski is available for each foot of a user.

Also, the standing device may include a first mounting frame part and a second mounting frame part, each for mounting a foot receiving device and/or a ski, respectively.

Further, the standing device may include a parallelogram guide that synchronizes the inclination of the mounting frame parts and thus optional associated skis transverse to a direction of travel.

The parallelogram guide can be a parallelogram linkage or a gear of a four-bar linkage, each of whose opposite links are of equal length.

The parallelogram guide or its components may have a shape similar to a sheet of metal, the width and length of which are much greater than its thickness.

The parallelogram guide, in particular its components, can be or have been created by a punching process, a laser cutting process, a milling process and/or a cutting process.

Furthermore, the parallelogram guide may include four components.

A first and second component may be parallel to each other, horizontally arranged, and oriented transverse to the direction of travel.

In addition, a tilting member of a first connecting device can be arranged, in particular centrally, on the first and second components.

Also, the first and/or second component of the parallelogram guide may each have two legs that are inclined with respect to each other, in particular forming a V-shape.

Centered on the first and second components, particularly at the transition from one leg of the V-shape to the other leg, the tilting member of the first connecting device may be rotatably attached.

It is also possible for the first and/or second components to each form a swivel joint at their ends with a third and/or fourth component of the parallelogram guide, the axis of rotation of which is oriented in the direction of travel and inclined towards the surface of the earth, similar to a rear spoiler of a racing car.

The first and/or second component can form a swivel joint with the tilting part, the axis of rotation of which is oriented in the direction of travel and inclined towards the surface of the earth, similar to a rear spoiler of a racing car.

As already mentioned, the parallelogram guide can include four components.

A third and fourth component can be parallel to each other and aligned in the direction of travel.

A first and a second component of the parallelogram guide may be rotatably disposed on the third and fourth components, respectively.

The third and fourth components may form multiple swivel joints with the first and second components, respectively.

A third component can be arranged on a first mounting frame part, in particular on its at least one frame member, for example, rotatably.

Also, a fourth component of the parallelogram guide can be arranged on a second mounting frame part, in particular on its at least one frame member, for example, rotatably.

Further, a third and/or fourth component of the parallelogram guide may have an L-shape, similar to a hockey stick. Here, the third and/or fourth components may include an angle between 100 and 150 degrees or a 135 degree angle between two legs.

The L-shape can comprise a short leg and a long leg, wherein, for example, the short leg can be arranged on a mounting frame part, in particular on its at least one frame member, and in particular rotatably.

Also, the short leg may include a first end and a second end, wherein the long leg may be disposed at the second end.

Also, at the second end, a rotational point, formable into a swivel joint, can be formed, at which the third and/or fourth component can be rotatably arranged, in particular fastened, to the corresponding mounting frame part, in particular to its at least one frame member.

The rotational point at the second end and a corresponding rotational point of the at least one mounting frame part, in particular the rotational point of the at least one frame member, may form a swivel joint.

The short leg can be arranged between two frame members of a mounting frame part, in particular rotatably.

At the first end of the short leg, a quick-connection point to a mounting frame part, in particular to its at least one frame member, can be arranged in order to prevent the relative movement of the third and/or fourth component of the parallelogram guide to the mounting frame part with the aid of a quick-connection device that can be fastened without tools and in a non-destructive manner.

The quick-connection point for a toolless, non-destructively releasable quick-connection device can be formed in each case as a feedthrough through the third and/or fourth component, in particular through its short leg.

Furthermore, the quick-connection point can be adapted to a toolless, non-destructively releasable quick-connection device with regard to shape and fit, in particular configured as a clearance fit or as a transition fit.

On the long leg of the third and/or fourth component of the parallelogram guide, the first and second components thereof, that is, the first and second components of the parallelogram guide, may be spaced apart.

Furthermore, the first and second components can be rotatably arranged on the long leg.

In addition, the first and second components may be rotatably disposed at the ends of the long leg of the third and fourth components of the parallelogram guide.

Also, the short and long legs may have a shape similar to a sheet of metal.

Furthermore, it is possible that each leg has a shape similar to a sheet of metal, the width and length of which are much greater than its thickness.

It may further be provided that the third and/or fourth component is or has been created by a stamping process, a laser cutting process, a milling process and/or a cutting process.

The short leg and the long leg can be twisted 90 degrees to each other and placed against each other.

The third and/or fourth components, in particular their short and long legs, can be formed in one piece.

In an operating state in which the ski winter sports device is ready for downhill sliding, the relative movement of the third and/or fourth component of the parallelogram guide to the mounting frame part may be prevented, thus ensuring safe downhill sliding.

Furthermore, in a transport state in which the ski winter sports device can be transported to the place of use, the relative movement of a mounting frame part to the third and/or fourth component of the parallelogram guide can be permitted, so that by rotating the third and/or fourth component and the mounting frame part relative to one another, in particular as viewed in the direction of travel, the spatial volume of the ski winter sports device, in particular the overall height and/or the overall length of the ski winter sports device, can be reduced in comparison with the operating state.

In an operating state, the angle between the third and/or fourth component of the parallelogram guide, in particular its long leg, and the associated mounting frame part, in particular to its at least one frame member, can be unchangeable.

Furthermore, in a transport state, the angle between the third and/or fourth component, in particular its long leg, and the associated mounting frame part, in particular to its at least one frame member, can be changed.

Also, in the operating condition, the third and/or fourth component, in particular its long leg, may include an angle of between 90 and 150 degrees, in particular of 120 degrees, with the associated mounting frame part.

In the transport state, the third and/or fourth component, in particular its long leg, can enclose an angle of between 150 and 200 degrees, in particular 180 degrees, with the associated mounting frame part.

Also, in the transport state, in order to reduce the spatial volume of the ski winter sports device, the third and/or fourth component of the parallelogram guide can be rotatably connected to the at least one mounting frame part, in particular in a clockwise direction.

The rotational point at the second end of the third and/or fourth component of the parallelogram guide and the rotational point of the at least one mounting frame part, in particular the rotational point of the at least one frame member, may form a swivel joint.

In the transport state, the third and/or fourth component can be folded into line with the mounting frame part so that a long leg of the third and/or fourth component is arranged in extension of the mounting frame part, whereby the spatial volume, in particular the overall height and/or the overall length, of the ski winter sports device can be reduced compared to the operating state.

The third and/or fourth component and the mounting frame part can be configured to be foldable and/or movable about at least one horizontal axis that is oriented transversely to the direction of travel.

Furthermore, the parallelogram guide may comprise a fifth component with which the rear ends, with respect to the direction of travel of the ski winter sports device, of the two mounting frame parts are hingedly connected to each other.

The fifth component may have two legs that are inclined towards each other, in particular forming a V-shape.

A connection device for connecting the fifth component to the frame and/or to the first connecting device can be arranged centrally on the fifth component, in particular at the transition from one leg of the V-shape to the other leg.

The fifth component can have a pivot point at each of its ends, formable into a swivel joint, whose axis of rotation is oriented in the direction of travel and inclined towards the surface of the earth, similar to a rear spoiler of a racing car.

The fifth component may have at its center a pivot point for a connection device whose axis of rotation is oriented in the direction of travel and inclined toward the surface of the earth, similar to a rear spoiler of a race car.

It is noted that the following features may apply individually or in combination to the first, second, third, fourth and/or fifth aspects.

Thus, the standing device may include a connection device that connects the fifth component of the parallelogram guide to the frame and/or to the first connecting device.

The connection device can have a variable length, in particular it can be telescoped. It is also conceivable that the variable length can be locked, so that the connection device can be fixed at the desired length after setting. It is also possible for the connection device to have an invariable or unchangeable length.

Also, the connection device may comprise an energy storage and/or an energy converter. Thus, the connection device can have a spring element and/or a damper element. Thus, movements between the frame member and the standing device can be limited and/or damped.

The energy storage and/or energy converter and/or telescoping formation may be arranged in a line.

The connection device can be attached to the frame and/or to the first connecting device in a toolless, non-destructively releasable manner via a quick-connection device that can be attached in a toolless, non-destructively releasable manner.

Further, a first end of the connection device may receive the quick-connection device.

Also, the connection device may have a feedthrough at its first end through which the quick-connection device may be passed.

A corresponding feedthrough may also be provided in the frame component of the frame, so that the quick-connection device is insertable into said feedthroughs of the frame component and the connection device to connect them all together.

The feedthrough, in particular formed as a bore, can form a fit with the quick-connection device, in particular a clearance fit or a transition fit.

The connection device may include a second end attached to the fifth component of the parallelogram guide, in particular rotatably attached to a pivot point of the fifth component to form a swivel joint or a rigid connection.

The connection device can be attached to the fifth component of the parallelogram guide in a toolless, non-destructively releasable manner via a quick-connection device.

Further, the first end of the connection device may receive the quick-connection device.

Also, the connection device may have a feedthrough at its second end through which the quick-connection device may be passed.

The feedthrough, in particular formed as a bore, can form a fit with the quick-connection device, in particular a clearance fit or a transition fit.

Both the pivot point of the fifth components and the second end of the connection device may each have, or may be configured as, a feedthrough, configured as a bore, for receiving a tool-less, non-destructively releasably fastenable quick-connection device connecting the connection device and the fifth component.

The aforementioned feedthroughs and the quick-connection device can be adapted to each other in terms of shape and fit, in particular configured as a clearance fit or as a transition fit.

As a result, therefore, the quick-connection device can be released at the first and/or second end of the connection device to quickly release the connection device from the fifth component of the parallelogram guide and/or the frame without tools or destruction.

Furthermore, the connection device can be constructed in at least two parts. The two parts can be configured to be movable relative to each other. In particular, the two parts can be connected to each other via a lockable and releasable swivel joint.

Here, each part of the connection device or only one of the two can be configured to be telescopic.

Also, each part of the connection device may include an energy storage and/or an energy converter.

Further, the standing device may include a foot receiving device that receives a shoe of a user.

The foot receiving device can be foldably arranged on at least one mounting frame part of the standing device or on a connecting component of at least one mounting frame part. The foot receiving device can be folded about an axis which is oriented in the same direction as the direction of travel.

The foot receiving device may include a base member attached to a connecting component of at least one mounting frame part, and on which the sole of a user's shoe is placeable.

The base member can be formed as a plate and with protrusions to increase the friction between the sole of a shoe and the base member.

In addition, the standing device may include a foot receiving device that receives a shoe of a user.

The foot receiving device may include a retaining device that is attached to a connecting component of at least one mounting frame part, and that at least partially prevents removal of a user's shoe through an opening between the retaining device and a base member of the foot receiving device.

The retaining device can be C-shaped or U-shaped.

One of the two opposing flanges of the C-shaped or U-section retaining device can be attached to a base member of the foot receiving device and/or to a connecting component of at least one mounting frame part.

Furthermore, the retaining device can have at least one guide along which one of the two opposing flanges of the C-shaped or U-section retaining device can be slidably arranged in order to adapt the distance between the flange and the base member and/or the position in the direction of travel to the size and shape of a user's shoe.

As mentioned above, it is noted as a precaution that the following features may apply individually or in combination to the first, second, third, fourth and/or fifth aspects.

Furthermore, the ski winter sports device may be configured such that the holding device remains rotatably connected to the frame after a tool-less, non-destructively releasable quick-connection device of a second connecting device of the ski winter sports device has been released, so that the ski winter sports device may be transferred from the operating state to the transport state and vice versa by moving the holding device relative to the frame.

Also, the ski winter sports device may include a second connecting device for attaching the holding device to the frame.

The second connecting device may be configured to quickly allow and quickly stop pivoting of the frame and the holding device.

The second connecting device may include a third connecting element for connecting the frame to the holding device.

The third connecting element may be arranged between two frame components of the frame.

The third connecting element may be hinged to the frame.

In addition, the third connecting element can comprise a pivot point, in particular formed as a feedthrough and/or formable into a swivel joint, about which the holding device is rotatably attached to the frame, in particular in the transport state, for example, only in the transport state.

The pivot point can be configured for a bolt or a screw.

Further, the pivot point and a rotational point of the second end of the frame component of the frame may form a swivel joint.

The second connecting device or the third connecting element of the second connecting device may be integrally formed with the holding device or integrally formed with a control tube member of the holding device.

The third connecting element can comprise a quick-connection point, in particular formed as a feedthrough and/or formable into a swivel joint, in order to prevent the relative rotational movement of the holding device to the frame about the pivot point with the aid of a quick-connection device which can be fastened without tools and in a non-destructively releasable manner.

The quick-connection point and the second junction at the second end of the frame component, together with the pivot point and the rotational point, may form a lockable and/or releasable swivel joint.

The quick-connection point can be adapted to a toolless, non-destructively releasable quick-connection device in terms of shape and fit, in particular configured as a clearance fit or as a transition fit.

Further, the pivot point and the quick-connection point may be spaced apart so that relative rotation of the holding device and the frame is permitted or possible and/or can be prevented.

In the operating state, the frame and the third connecting element can be connected positively and/or non-positively, in particular with the aid of the quick-connection device.

Furthermore, the ski winter sports device, in particular its first connecting device and/or its second connecting device, may comprise at least one quick-connection device for the toolless, non-destructive and releasable attachment of devices and/or elements.

In addition, the ski winter sports device may comprise at least one quick-connection device for the toolless, non-destructive and releasable mounting of devices and/or elements and the ski winter sports device may be configured to quickly and non-destructively release the holding device from the frame and/or the standing device from the frame and/or the parallelogram guide from the mounting frame part, as well as to quickly connect them in order to transfer the ski winter sports device from the transport state to the operating state or vice versa.

The quick-connection device can be configured to connect a first connecting element of the first connecting device to the frame in a toolless, non-destructive, and releasably fastenable manner.

Furthermore, the quick-connection device can be configured to connect the frame, in particular its frame component, to a third connecting element of the second connecting device in a toolless, non-destructive and releasably fastenable manner.

The quick-connection device can be configured to connect the third and/or fourth component of the parallelogram guide to the mounting frame part in a toolless, non-destructive and releasable manner.

"Tool-less" may be understood in the present context to mean that the quick-connection device is operable by a user by hand, without the use of a tool that must be carried.

"Non-destructively and releasably fastenable" or a "tool-less, non-destructively and releasably fastenable" can be understood in the present description as meaning, for example, that a quick-connection device can be used to arrange two elements and/or an element with a device and/or two devices against each other in such a way that they can be released from each other and reconnected to each other as often as desired without destruction.

Furthermore, the quick-connection device can be configured similar to a quick release.

The quick release may comprise an eccentric lever and a clamping axle, at one end of which the eccentric lever is arranged and at the other end of which a clamping element is arranged.

The quick release can clamp devices and/or elements of the ski winter sports device together.

The quick release may include a clamping element formed as a bolt, a first end of which has a thread.

The clamping element may also include a nut for screwing.

A second end of the clamping element may include an eccentric clamping lever for generating a clamping force.

Further, the quick-connection device may include a snap lock.

The snap lock may be formed on a device or on an element or on the frame.

The quick-connection device may have a plug-in element to be received in a snap lock.

The plug-in element may have a shape similar to a screw.

In addition, the snap lock may be similar to a carabiner that secures a corresponding counterpart.

Also, the quick-connection device can have a ratchet mechanism for realizing a friction-type joint, in particular for bracing, of the frame to the first connecting device, in particular its first connecting element, and/or of the frame to the second connecting device and/or of the mounting frame part to the parallelogram guide.

The quick-connection device can be configured as a tension lock.

The tension lock may comprise a strap and a tensioning lever, wherein the tension lock connects a device, a part or an element to a further device, part or element in a positive and/or non-positive manner.

Furthermore, the quick-connection device can be configured as a screw connection, in particular with a screw body with external thread and internal thread.

The internal thread can be cut into a device or into an element or can be realized with a nut.

Furthermore, the quick-connection device can be configured as a plug-in bolt, in particular as a plug-in bolt with a safety device to prevent it from being pulled out.

The quick-connection device can be configured as a bolt, the first end of which has a hole for a split pin, in particular for a folding pin or a spring split pin, transverse to its axial direction.

The quick-connection device may be in the form of a bolt, the second end of which has a grip portion for gripping and guiding.

In addition, the quick-connection device may have a threaded portion at its first end and a grip portion at its second end for gripping and guiding.

Also, the quick-connection device and the junctions and quick-connection points may have a fit, particularly a clearance fit or a transition fit.

Furthermore, a pivot point and/or rotational point can be configured as a feedthrough.

The swivel joint formed by these can be configured to be lockable and/or releasable.

In addition, the swivel joint or the swivel joint formed by a pivot point and/or by a rotational point, in which one component is relatively rotatable with respect to another component, may be formed as a plain bearing and/or as a rolling bearing.

Further, the frame may include a carrying device for carrying by hand and/or for hooking to a seat of a ski lift.

In the operating state, the quick-connection device can movably connect the first connecting device to the frame.

In the transport state, a connection between the first connecting device and the frame may be released after the quick-connection device is released, and another connection may persist.

Furthermore, three skis can be arranged on the ski winter sports device.

The three skis can be arranged relative to each other similar to the wheels of a tricycle.

The ski of the holding device can be arranged in front of the two skis of the standing device in the direction of travel.

The ski of the holding device can be arranged between two skis of the standing device, viewed transversely to the direction of travel of the ski winter sports device.

The first mounting frame part and the second mounting frame part, and thus the two skis, can be arranged hip-width apart.

Of course, it is also possible that the ski winter sports device comprises skis, in particular three skis.

In the present description, the term "in the direction of travel" can be understood as a direction starting at the standing device, towards the frame and further towards the holding device, whereby all three mentioned devices can be arranged in series and one behind the other.

Furthermore, the terms "in particular" and "for example" may be used synonymously throughout this description.

The present invention is explained in more detail below with reference to an example of an embodiment in conjunction with associated drawings.

In the following description, the same reference signs are used for the same objects.

FIG. 1 shows a spatial view of a ski winter sports device 1 and FIG. 2 shows a top view of the ski winter sports device from FIG. 1.

More specifically, FIGS. 1 and 2 show a ski winter sports device 1, more particularly a ski trike, for downhill sliding with three skis A, B, C (schematically indicated).

The ski winter sports device 1 has a holding device 4 for holding by hand, wherein a ski C can be arranged on the holding device 4.

Furthermore, the ski winter sports device 1 has a standing device 2 on which a user can stand, wherein two skis A, B can be arranged on the standing device 2, which can be arranged next to each other in the direction of travel F, so that one ski A, B is available for each foot of a user.

In addition, the ski winter sports device 1 comprises a frame 3 for connecting the holding device 4 to the standing device 2, wherein the frame 3 and the standing device 2 are relatively movably connected to each other.

Furthermore, both the frame 3 and the standing device 2 are configured to be foldable relative to each other, and the frame 3 and the holding device 4 are configured to be foldable relative to each other, so that the required spatial volume RV of the ski winter sports device 1, in particular the overall length GL and the overall height GH of the ski winter sports device 1, can be reduced.

However, it is also possible that only the frame 3 and the standing device 2 are configured to be foldable relative to each other, so that the required spatial volume RV of the ski winter sports device 1, in particular the total length GL and the total height GH of the ski winter sports device 1, can be reduced.

Another possibility is that only the frame 3 and the holding device 4 are configured to be foldable relative to each other, so that the required spatial volume RV of the ski winter sports device 1, in particular the overall length GL of the ski winter sports device 1, can be reduced.

In this context, total length GL and total height GH are understood and determined in such a way that, when determining them, at least the skis or mounting frame parts 27, 28 of the standing device 2 rest on the ground or the surface of the earth.

With reference to FIGS. 1 and 2, the overall length GL of the ski winter sports device 1, as viewed in the direction of travel F, is formed by the distance from the foremost end of the holding device 4 with steering fork 65 to the rearmost end of the standing device 2, in particular to the rear end of mounting frame parts 27, 28.

The overall height GH of the ski winter sports device 1 is formed by the distance from the highest end of the holding device 4 to mounting frame parts 27, 28 of the standing device 2, viewed transversely to the direction of travel F.

FIGS. 3 to 8 show what the above-mentioned foldable design actually means.

FIG. 3 shows a side view of the ski winter sports device of FIG. 1 in an operating state, FIG. 4 shows a side view of the ski winter sports device of FIG. 1 during the transition from the operating state of FIG. 1 to a transport state, and FIG. 5 shows a side view of the ski winter sports device of FIG. 1 in a transport state.

FIGS. 6 to 8 show a spatial view of the ski winter sports device of FIGS. 3, 4, and 5, respectively, in various states.

Said FIGS. 3 to 8 show that the ski winter sports device 1 is configured to be transformed or transferred from a transport state (cf. FIGS. 5 and 8) to an operating state (cf. FIGS. 3 and 6) and vice versa, in particular to be transferred without tools.

In the transport state (cf. FIGS. 5 and 8), the ski winter sports device 1 can be transported to the place of use, and in the operating state (cf. FIGS. 3 and 6), it is ready for use for downhill sliding.

Furthermore, in the operating state (cf. FIGS. 3 and 6), the ski winter sports device 1 has a larger spatial volume RV compared to the transport state (cf. FIGS. 5 and 8), in particular a larger overall length GL and overall height GH.

In the present description, the term "spatial volume" is understood to mean that a rectangular cuboid with a height H, a length L and a depth T is placed over the ski winter sports device 1. Thereby, the ski winter sports device 1 contacts each surface of the cuboid. In other words, the ski winter sports device 1 fits exactly into the spatial volume RV of the rectangular cuboid. In the case of this rectangular cuboid, one side surface may be aligned parallel to the surface of the earth or to the ground.

The spatial volume RV or a side view of the rectangular cuboid with a height H and a length L is indicated in FIGS. 3 and 5. The depth of the spatial volume RV is not shown due to the side view shown. The depth corresponds to the width of the ski winter sports device 1. The depth T or width is indicated in FIGS. 6 to 8.

As can be seen in particular by looking at FIGS. 6 to 8, the ski winter sports device 1 can be folded about the axes G1, G2, G3, G4 which are oriented perpendicular to the direction of travel F of the ski winter sports device 1.

More precisely, the frame 3 and the standing device 2 are foldable and movable around the horizontal axes G1, G2, G3, G4, which is oriented transversely to the direction of travel F.

Furthermore, the frame 3 and the holding device 4 can be folded and moved about a horizontal axis G3, which is also aligned transversely to the direction of travel F.

In summary, it can be stated that the axes G1, G2, G3, G4 are aligned parallel to each other, so that as a result the ski winter sports device 1 can be folded and moved about a horizontal axis G which is aligned transversely to the direction of travel F.

In other words, in the transport state (cf. FIGS. 5 and 8), the frame 3 and the standing device 2 are movable towards each other, similar to rotatably interconnected levers of a closing pair of scissors or similar to a folding blade of a pocket knife, and/or are movable away from each other, similar to rotatably interconnected levers of an opening pair of scissors or similar to a folding blade of a pocket knife.

The same applies to the frame 3 and the holding device 4, which are also movable towards each other, similar to rotatably interconnected levers of a closing pair of scissors or similar to a folding blade of a pocket knife, and/or movable away from each other, similar to rotatably interconnected levers of an opening pair of scissors or similar to a folding blade of a pocket knife.

Thus, in the transport state (cf. FIGS. 5 and 8), the frame 2 is folded or foldable in the direction of the standing device 2 or vice versa, so that the spatial volume RV, in particular the overall length GL and the overall height GH, of the ski winter sports device 1 is reduced compared to the operating state (cf. FIGS. 3 and 6).

Furthermore, in the transport state (cf. FIGS. 5 and 8), the holding device 4 is folded or foldable in the direction of the frame 3 or vice versa, so that the spatial volume RV, in particular the total length GL and the total height GH, of the ski winter sports device 1 is reduced compared to the operating state (cf. FIGS. 3 and 6).

With reference to FIG. 5, which shows the transport state, the overall length GL of the ski winter sports device 1, as seen in the direction of travel F, is formed as follows; namely from the end of the holding device 4, which, as seen against the direction of travel F, projects beyond the rearmost end of the standing device 2 in the operating state, in particular the rear end of mounting frame parts 27, 28, to an upper end 15 of a tilting member 14 of a first connecting device 5, which connects the frame 3 to the standing device 2 so as to be movable relative to one another.

FIG. 9 shows another spatial view of the ski winter sports device 1 of FIG. 1, but with only one frame component 17. FIG. 10, on the other hand, shows an enlarged view of FIG. 9, with FIG. 11 showing the same view as FIG. 10 with further elements not shown in order to facilitate description and increase clarity.

FIG. 12 shows an enlarged view of FIG. 10, while FIG. 13 shows the same view as FIG. 12 but with additional elements not shown.

For the sake of simplicity and brevity, the aforementioned FIGS. 9 to 13 are described together, whereby reference is made to the respective drawing concerning particular details, which illustrates the described features recognizably well.

As shown in FIGS. 9 to 13, but also in FIGS. 1 to 8, the ski winter sports device 1 has a first connecting device 5 that connects the frame 3 to the standing device 2 in a relatively movable manner with respect to each other.

The first connecting device 5 is configured to allow a relative movement of the frame 3 and the standing device 2 with respect to each other, in particular to increase and/or decrease it, but in particular not to prevent it.

Also, the first connecting device 5 connects the frame 3 and the standing device 2 to each other in an articulated manner, wherein the frame 3 and the standing device 2 are precisely connected to each other via the first connecting device 5.

In this context, the first connecting device 5 is configured to limit the relative movement of the frame 3 and the standing device 2 with respect to each other in the operating state (cf. FIG. 9), in which the ski winter sports device 1 is ready for use for downhill sliding, in such a way that they can be moved relative to each other within a limited angular range and thus to ensure safe downhill sliding.

Here, the limited angular range allows a rotational movement between 15 and 30 degrees from a frame component 17 of the frame 3 to a frame member 29, 30 of the standing device 2 or to a mounting frame part 27, 28 of the standing device 2.

Furthermore, the first connecting device 5 is configured to increase the relative movement of the frame 3 and the standing device 2 in the transport state in which the ski winter sports device 1 can be transported to the place of use (cf. FIGS. 5 and 8), to increase the relative movement of the frame 3 and the standing device 2 in such a way that, by folding the frame 3 and the standing device 2 relative to one another, in particular as viewed in the direction of travel F, the spatial volume RV of the ski winter sports device 1, in particular the overall length GL and the overall height GH of the ski winter sports device 1, can be reduced in comparison with the operating state (cf. FIGS. 3 and 6).

Also, the first connecting device 5 is arranged on the frame 3 and on the standing device 2.

In this case, the first connecting device 5 is configured to fold or move the frame 3 and the standing device 2 about the horizontal axes G1 and G2, which are aligned transversely to the direction of travel F.

Furthermore, in the transport state (cf. FIGS. 5 and 8), a relative movement of the frame 3 towards the standing device 2 can be increased with the aid of the first connecting device 5 in such a way that the frame 3 and the standing device 2 are configured to be foldable, similar to rotatably interconnected levers of a closing pair of scissors or similar to a foldable blade of a pocket knife. As a result, the required spatial volume RV of the ski winter sports device 1, in particular the overall height GH and the overall length GL of the ski winter sports device 1, can be reduced compared to the operating state (compare FIGS. 5, 8 with FIGS. 3, 6).

In the operating state, on the other hand (cf. FIGS. 9 to 13 and 3, 6), a relative movement of the frame 3 towards the standing device 2 is reduced with the aid of the first connecting device 5 in such a way that the first connecting device 5 prevents folding, but safe downhill sliding is ensured.

Thus, in the operating state, a relative movement of the frame 3 towards the standing device 2 is reduced with the aid of the first connecting device 5 in such a way that a movement of the frame 3 relative to the standing device 2 via the first connecting device 5 can be limited at least to a large extent, in particular to a limited angular range.

As mentioned above, the limited angular range permits rotational movement between 15 and 30 degrees, from the frame 3 to the standing device 2 or to a mounting frame part 27, 28 of the standing device 2.

Also, the first connecting device 5 is configured to allow movement or folding of the frame 3 relative to the standing device 2.

To realize the above-mentioned functions, the first connecting device 5 has two first connecting elements 6, each with a first pivot point 7, formable into a swivel joint, to which the frame 3 is rotatably attached, in particular in the transport state (cf. FIGS. 9 and 10).

In addition, the first connecting device 5 or its two first connecting elements 6 has a second pivot point 8, formable into a pivot joint, to which the first connecting elements 6 are rotatably attached with a second connecting element 10 of the first connecting device 5 (cf. FIGS. 9 and 10).

Here, the first and second pivot points 7, 8 are arranged at opposite ends of the respective first connecting element 6 and form part of a swivel joint.

As can be seen from FIGS. 9 and 10, the first connecting elements 6 are formed from a sheet of metal whose width and length are much greater than its thickness, each connecting element 6 having been created using a stamping process, a laser cutting process, a milling process and/or a cutting process.

Furthermore, each first connecting element 6 has a junction 9 to the frame 3 between the first and second pivot points 7, 8 (cf. FIGS. 9 and 10) in order to prevent relative movement between the frame 3 and the first connecting element 6 about the first pivot point 7 with the aid of a toolless, non-destructive, releasably fastenable quick-connection device 67A (not shown, only its attachment point).

The junction 9 is configured for a toolless, non-destructive, releasably fastenable quick-connection device 67A as a feedthrough through the first connecting element 6.

Also, the junction 9 is adapted to a toolless, non-destructive, releasably fastenable quick-connection device 67A with respect to shape and fit, in particular formed as a clearance fit or as a transition fit.

Thus, in the operating state, the quick-connection device 67A movably connects the first connecting device 5 to the frame 3, and in the transporting state, after the quick-connection device 67A is released, a connection between the first connecting device 5 and the frame 3 is released and another connection persists. As a result, in the transport state, the pivot point 7 at which the frame components 17 of the frame 3 are rotatably arranged forms a pivot point around which frame components 17 and the first connecting elements 6 can rotate.

As FIGS. 9 to 13 further show, the first connecting device 5 has a second connecting element 10 with a pivot point 11, formable into a swivel joint (cf. in particular FIGS. 10 and 11).

A first connecting element 6 of the first connecting device 5 is rotatably attached to the pivot point 11. The pivot point 11 of the second connecting element 10 is rotatably connected to the second pivot point 8 of the first connecting elements 6 to form a swivel joint.

In this case, the pivot point 11 is arranged within the second connecting element 10, wherein the second connecting element 10 comprises a first and a second end stop 12, 13 for a toolless, non-destructively releasable quick-connection device 67A (cf. FIGS. 11 and 12).

Further, the first and second end stops 12, 13 are spaced apart to limit relative movement of the first connecting elements 6 of the first connecting device 5 with respect to the second connecting element 10.

As can be seen in FIG. 12, a first leg S1, formed by a line between the first end stop 12 and the pivot point 11 of the second connecting element 10, and a second leg S2, formed by a line between the second end stop 13 and the pivot point 11 of the second connecting element 10, enclose an angle δ of 100 degrees.

As FIGS. 11 and 12 show, each end stop 12, 13 is formed as a nose projecting from the second connecting element 10.

Each end stop 12, 13 is adapted in terms of its shape to a toolless, non-destructively releasably fastenable quick-connection device 67A (not shown) to ensure non-destructive slinging.

Furthermore, as FIGS. 11 and 12 show, the second connecting element 10 has a curved path or is disc-shaped between the first and second end stops 12, 13.

As indicated, the first connecting device 5 has a tool-less, non-destructively releasably fastenable quick-connection device 67A (not shown) for slinging against the end stops 12, 13 of the second connecting element 10 and limiting relative movement between the first and second connecting members 6, 10 of the first connecting device 5.

In this case, the quick-connection device 67A (not shown) is configured to connect the first connecting elements 6 to the frame 3, in particular to releasably fasten the first connecting elements 6 to the frame 3 without tools and in a non-destructive manner.

Here, the quick-connection device 67A (not shown) is adapted to the junction 9 of the first connecting element 6 of the first connecting device 5 in terms of shape and fit, in particular formed as a clearance fit or transition fit.

In the operating condition, the quick-connection device 67A (not shown) is arranged in the junction 9 of the first connecting element 6 to prevent rotation of the first connecting elements 6 relative to the frame 3 about the first pivot point 7 of the first connecting element 6.

In the transport state, however, the quick-connection device 67A (not shown) is removed from the junction 9 of the first connecting elements 6, allowing rotation of the first connecting elements 6 relative to the frame 3 about the first pivot point 7 of the first connecting elements 6.

Furthermore, as shown in FIGS. 10 to 12, the first connecting device 5 has a tilting member 14 which is configured to tilt transversely to a direction of travel F according to the inclination of the standing device 2, in particular its two arrangeable skis A, B or the inclination of the mounting frame parts 27, 28 of the standing device 2.

Thus, the first connecting device 5 has a tilting member 14 which is connected to a parallelogram guide 34 so that the inclination of the standing device 2, in particular its two arrangeable skis A, B or mounting frame parts 27, 28, can be transferred to the tilting member 14 transversely to the direction of travel F or can be synchronized with the tilting member 14.

The tilting member 14 has an upper end 15 and a lower end 16, with the second connecting element 10 of the first connecting device 5 being rotatably or rigidly attached to the lower end.

The lower and upper ends 15, 16 are rotatably connected to a first and to a second component 35, 36 of a parallelogram guide 34, respectively.

The second component 36 of the parallelogram guide 34 is aligned in parallel at the lower end 16 with the first component 35 of the parallelogram guide 34 at the upper end 15.

The tilting member 14 of the first connecting device 5 and the second connecting element 10 of the first connecting device 5 are formed in one piece or integrally or from one piece.

In summary, it can be stated for FIGS. 1 to 12 that in one operating state the frame 3 and the standing device 2 are movable relative to each other in a limited angular range. In this case, the frame 3 is configured to be movable relative to the standing device 2 within a limited angular range, so that unevenness of the ski slope during downhill sliding can be compensated for by the relative movement of the frame 3 and the standing device 2 within the limited angular range.

Furthermore, it can be summarized that the ski winter sports device 1 is configured in such a way that the frame 3 and the standing device 2 remain rotatably connected to each other beyond a limited angular range after the toolless and non-destructive release of a quick-connection device 67A of a first connecting device 5. Thus, the ski winter sports device 1 can be transferred from the operating state to the transport state and vice versa by moving the frame 3 relative to the standing device 2.

Expressed again in other words, the ski winter sports device 1 is configured in the operating state such that the frame 3 and the standing device 2 are rotatably connected to each other within a limited angular range after the tool-less and releasable installation of a quick-connection device 67A of a first connecting device 5. Thus, by moving the frame 3 relative to the standing device 2, unevenness of the ski slope during downhill sliding can be compensated by the relative movement of the frame 3 and the standing device 2 within the limited angular range, whereby a transfer from the operating state to the transport state and vice versa is not possible by moving the frame 3 relative to the standing device 2.

As mentioned above, the limited angular range allows relative rotational movement between 15 and 30 degrees, from a frame component 17 of the frame 3 to a frame member 29, 30 of the standing device 2 or to a mounting frame part 27, 28 of the standing device 2.

In this context, the ski winter sports device 1 is configured in such a way that the frame 3 and the standing device 2 together have an L-shape in the operating state, similar to an ice hockey stick. Thus, the frame 3 and the standing device 2 together may include an angle between 100 and 150 degrees in the operating condition. Such an angle enables an ergonomic posture on the ski winter sports device.

Further, as can be seen in FIGS. 10 to 13, the standing device 2 has a parallelogram guide 34 which synchronizes the inclination of the mounting frame parts 27, 28 and thus optional associated skis A, B transverse to a direction of travel F.

The parallelogram guide 34 is a parallel crank gear or a gear of a four-link chain, each of whose opposite links are of equal length.

Also, the parallelogram guide 34 or its individual parts have a shape similar to a sheet of metal, the width and length of which are much greater than its thickness, the parallelogram guide 34, in particular its components 35, 36, 37, 38, having been produced by a punching process, a laser cutting process, a milling process and/or a cutting process.

Furthermore, the parallelogram guide 34 has four components 35, 36, 37, 38, as can be seen particularly well in FIG. 13, wherein a first and a second component 35, 36 are parallel to each other, horizontally arranged and oriented transversely to the direction of travel F.

As shown in FIGS. 10 to 13, centrally, at the first and second components 35, 36, the tilting member 14 of the first connecting device 5 is arranged.

The first and second components 35, 36 of the parallelogram guide 34 each have two legs that are inclined with respect to each other to form a V-shape.

Centered on the first and second components 35, 36, in particular at the transition from one leg of the V-shape to the other leg, the tilting member 14 of the first connecting device 5 is rotatably attached.

The first and second components 35, 36 each form a swivel joint 39, 40, 41, 42 at their ends with a third and fourth component 37, 38, respectively, of the parallelogram guide 34, wherein the axis of rotation H of the swivel joints 39, 40, 41, 42 is oriented in the direction of travel F and is inclined toward the surface of the earth, similar to a rear spoiler of a racing car.

The first and second components 35, 36 each form a swivel joint 43, 44 with the tilting member 14, the axis of rotation H of which is also oriented in the direction of travel F and is inclined towards the surface of the earth, similar to a rear spoiler of a racing car.

Further, as previously mentioned, the parallelogram guide 34 has third and fourth components 37, 38 that are parallel to each other and oriented in the direction of travel F.

As will be discussed in more detail below, the standing device 2 includes first and second mounting frame parts 27, 28 each of which for mounting a foot receiving device 55 and a ski A, B.

In this case, the two mounting frame parts 27, 28 each comprise two frame members 29, 30, to which a connecting component 31 for a foot receiving device 55 and for a ski A, B is attached.

Regarding the parallelogram guide 34, it should be noted that now its third component 37 is rotatably arranged on the first mounting frame part 27, in particular on its frame members 29, 30, and the fourth component 38 is rotatably arranged on the second mounting frame part 28, in particular on its frame members 29, 30.

As shown in particular in FIGS. 11 and 13, the third and fourth components 37, 38 of the parallelogram guide 34 have an L-shape, similar to a hockey stick.

In this case, the L-shape has a short leg K and a long leg L, the short leg K being rotatably arranged in each case on the aforementioned mounting frame parts 27, 28, in particular on their frame members 29, 30.

The short leg K has a first end and a second end, with the long leg L disposed at the second end.

Also formed at the second end is a rotational point 45, formable into a swivel joint, at which the third or fourth component 37, 38 is rotatably arranged on the corresponding mounting frame part 27, 28, in particular on its frame members 29, 30 (cf. FIGS. 3 to 8 and 11, 13).

The rotational point 45 at the second end and a corresponding rotational point 32 of the mounting frame parts 27, 28, in particular the rotational point 32 of the frame members 29, 30, form a swivel joint.

The short leg K is rotatably arranged between the two frame members 29, 30 of the first and second mounting frame parts 27, 28, respectively.

At the first end of the short leg K, a quick-connection point 46 is arranged to the corresponding mounting frame part 27, 28, in particular to its frame members 29, 30. Thus, with the aid of a quick-connection device 67B which can be fastened in a non-destructively releasable manner without tools, the relative movement of third or fourth components 37, 38 of the parallelogram guide 34 to the mounting frame part 27, 28 can be prevented.

For a quick-connection device 67B that can be fastened without tools and in a non-destructively releasable manner, the quick-connection point 46 is formed in each case as a feedthrough through the third or fourth component 37, 38, in particular through its short leg K.

Furthermore, the quick-connection point 46 is adapted to a quick-connection device 67B that can be fastened without tools and in a non-destructively releasable manner with respect to shape and fit, in particular formed as a clearance fit or as a transition fit.

On the long leg L of the third and fourth components 37, 38 of the parallelogram guide 34, their first and second components 35, 36 are spaced apart (cf. FIGS. 10 to 13).

Thus, on the long leg L, the first and second components 35, 36 are rotatably arranged, the first and second components 35, 36 being rotatably arranged at the ends of the long leg L of the third and fourth components 37, 38 of the parallelogram guide 34.

The short and long legs K, L have a shape similar to a sheet of metal whose width and length are much greater than its thickness, wherein the third and fourth components 37, 38 have been created by a stamping process, a laser cutting process, a milling process and/or a cutting process.

The short and the long leg K, L are, as FIG. 13 shows, twisted by 90 degrees to each other and arranged against each other, whereby the third and fourth components 37, 38, in particular their short and long leg K, L, are formed in one piece.

Furthermore, FIGS. 10 to 13 and 3, 6 show that in the operating condition in which the ski winter sports device 1 is ready for use for downhill sliding, the relative movement of the third and fourth components 37, 38 of the parallelogram guide 34 with respect to the mounting frame parts 27, 28 is prevented, thus ensuring safe downhill sliding.

Furthermore, in the transport state in which the ski winter sports device 1 can be transported to the place of use, the relative movement of the corresponding mounting frame part 27, 28 to the third or fourth component 37, 38 of the parallelogram guide 34 is permitted, so that by rotating the third and fourth components 37, 38 and the mounting frame part 27, 28 relative to one another, in particular as viewed in the direction of travel F, the spatial volume RV of the ski winter sports device 1, in particular the overall height GH and the overall length GL of the ski winter sports device 1, can be reduced in comparison with the operating state (cf. FIGS. 3, 6 with 5, 8).

As shown in FIGS. 10, 12 and 13, in the operating condition the angle $\beta$ between the third or fourth component 37, 39 of the parallelogram guide 34, in particular its long leg L, and the associated mounting frame part 27, 28, in particular to its frame members 29, 30, is unchangeable.

On the other hand, in the transport state (cf. FIGS. 5 and 8), the angle $\beta$ between the third and fourth components 37, 38, in particular their long leg L, and the associated mounting frame part 27, 28, in particular to its frame members 29, 30, is changeable.

Thus, in the operating condition, the third and fourth components 37, 38, or their long legs L, enclose the angle β of 120 degrees with the associated mounting frame part 27, 28 (cf. FIGS. 10, 12 and 13).

In the transport state, however, the third or fourth component 37, 38 or its long leg L encloses an angle β of 180 degrees with the associated mounting frame part 27, 28 (cf. FIGS. 5 and 8).

Thus, in the transport state, in order to reduce the volume of space RV of the ski winter sports device 1, the third and fourth components 37, 38 of the parallelogram guide 34 are rotatably connected to the mounting frame parts 27, 28.

The rotational point 45 at the second end of the third and fourth components 37, 38 of the parallelogram guide 34 and the rotational point 32 of the mounting frame parts 27, 28, in particular the rotational point 32 of the frame members 29, 30, form a swivel joint.

In the transport state—as shown in FIGS. 5 and 8—the third and fourth components 37, 38 are folded in line or along a direction with the mounting frame part 27, 28, so that the long leg L of the third and fourth components 37, 38 is arranged in extension of the mounting frame part 27, 28. As a result, the spatial volume RV, in particular the overall height GH and the overall length GL, of the ski winter sports device 1 can be reduced compared to the operating state (compare FIGS. 5 and 8 with FIGS. 3 and 6).

The third and fourth components 37, 38 and the mounting frame part 27, 28 are configured to be foldable about a horizontal axis G4, which is oriented transversely to the direction of travel F.

As in FIGS. 1 to 9 and 14, which represent a further spatial view of the ski winter sports device 1 of FIG. 1, shown, the parallelogram guide 34 has a fifth component 47. The rear ends of the two mounting frame parts 27, 28, with respect to the direction of travel F of the ski winter sports device 1, are connected to the fifth component 47 in an articulated manner.

The fifth component 47 has two legs that are inclined with respect to each other, in particular forming a V-shape.

A connection device 51 for connecting the fifth component 47 to the frame 3 or to the first connecting device 5 is arranged centrally on the fifth component 47, in particular at the transition from one leg of the V-shape to the other leg. In the present case, the fifth component 47 is connected to the frame 3.

The fifth component 47 also has at each of its ends a pivot point 48, 49, formable into a swivel joint, whose axis of rotation H is oriented in the direction of travel F and is inclined toward the surface of the earth, similar to a rear spoiler of a racing car.

Furthermore, the fifth component 47 centrally has a pivot point 50 for a connection device 51, the axis of rotation H of which is also oriented in the direction of travel F and is inclined towards the surface of the earth, similar to a rear spoiler of a racing car.

FIGS. 9 and 14 show that the standing device 2 has a connection device 51, which has been omitted from the other drawings for clarity.

The connection device 51 connects the fifth component 47 of the parallelogram guide 34 to the frame 3.

The connection device 51 has a variable length or is configured to be telescopic.

In addition, the connection device 51 has an energy storage 52, wherein the energy storage 52 and the telescoping formation are arranged in a line.

As FIGS. 9 and 14 show, the connection device 51 can be attached to the frame 3 in a toolless, non-destructively releasable manner via a quick-connection device (not shown).

Here, a first end 53 of the connection device 51 receives the quick-connection device (not shown), the connection device 51 having a passageway at its first end 53 through which the quick-connection device can be passed.

The frame components 17 of the frame 3 also have a corresponding feedthrough, so that the quick-connection device (not shown) can be inserted into said feedthroughs of the frame components 17 and the connection device 51 to connect them all together.

The feedthrough, formed as a bore, forms a fit with the quick-connection device (not shown), in particular a clearance fit or a transition fit.

Also, the connection device 51 has a second end 54 rotatably attached to a pivot point 50 of the fifth component 47 of the parallelogram guide 34 to form a swivel joint or a rigid connection.

Both the pivot point 50 and the second end 54 have each a feedthrough, formed as a bore, to receive a tool-less, non-destructively releasably fastenable quick-connection device (not shown) connecting the connection device 51 and the fifth component 47.

The aforementioned feedthroughs and the quick-connection device, which is not shown, are adapted to one another in terms of shape and fit, in particular configured as a clearance fit or as a transition fit.

As a result, the quick-connection device can be released at the first and/or second ends 53, 54 to quickly release the connection device 51 from the fifth component 47 of the parallelogram guide 34 and/or the frame 3 in a toolless and non-destructive manner.

FIGS. 2, 9 to 11 show the standing device 2 of the ski winter sports device 1, as described above, on which a user can stand and on which a ski can be arranged.

The standing device 2 has two mounting frame parts 27, 28 for arranging a foot receiving device 55 and a ski A, B.

The two mounting frame parts 27, 28 each have two frame members 29, 30, to which a connecting component 31 for a foot receiving device 55 and for a ski A, B can be attached.

Here, each mounting frame part 27, 28 has a plurality of connecting components 31 fastenable to frame members 29, 30 and to a ski A, B and to a foot receiving device 55.

Each connecting component 31 has a T-section formed by two flanges.

A ski A, B or a foot receiving device 55 is fastenable to one flange of the T-section, which is centered at the end of the other flange and transverse to the other flange.

Frame members 29, 30 are attached to the other flange of the T-section, the end of which is located on the one flange.

Each frame member 29, 30 is formed from a sheet of metal whose width and length are much greater than its thickness, each frame member 29, 30 being created by a stamping process, a laser cutting process, a milling process, and/or a cutting process.

Furthermore, as FIGS. 2, 9 to 11 show, the frame members 29, 30 are rotatably arranged on the third and fourth components 37, 38, respectively, of the parallelogram guide 34 of the standing device 2.

The parallelogram guide 34 synchronizes the inclination of the mounting frame parts 27, 28 and thus optional associated skis A, B transverse to the direction of travel F.

As can be seen in particular in FIGS. 2, 9 to 11, each mounting frame part 27, 28 has a front end and a rear end with respect to the direction of travel F of the ski winter sports device 1.

Each mounting frame part 27, 28, in particular its frame members 29, 30, has a rotational point 32 at the front end, which can be formed into a swivel joint. The third and fourth components 37, 38 of the parallelogram guide 34 of the standing device 2 are rotatably arranged around the rotational point 32.

At the front end, a quick-connection point 33, formable into a swivel joint, is arranged to the parallelogram guide 34, in particular its third or fourth component 37, 38. In this way, with the aid of a quick-connection device 67B which can be fastened in a non-destructively releasable manner without tools, the relative movement of third and fourth components 37, 38 to the mounting frame part 27, 28 or to its frame members 29, 30 about the rotational point 32 of the mounting frame parts 27, 28 can be prevented.

The quick-connection point 33 is formed as a feedthrough through the frame members 29, 30, wherein the quick-connection point 33 is adapted in terms of shape and fit, in particular formed as a clearance fit or as a transition fit, to a quick-connection device 67B that can be fastened without tools and in a non-destructively releasable manner.

As already mentioned, each mounting frame part 27, 28 has two frame members 29, 30, between which connecting components 31, in particular their flanges, are arranged, to which a ski A, B and a foot receiving device 55 can be attached.

The two frame members 29, 30 are spaced from each other in such a way that between these two frame members 29, 30 connecting components 31 and a third or fourth component 37, 38 of the parallelogram guide 34 can be arranged.

Formulated again in other words, the standing device 2 has two mounting frame parts 27, 28, in particular a first 27 and a second mounting frame part 28, each with two frame members 29, 30, between which in each case a plurality of connecting components 31 and a third or fourth component 37, 38 of the parallelogram guide 34 are arranged (cf. FIGS. 2, 9 to 11). A ski A, B and a foot receiving device 55 can be attached to each connecting component 31.

Furthermore, as almost all drawings show, the mounting frame parts 29, 30 are oriented in the same way, in particular parallel to each other.

A ski A, B and a foot receiving device 55 and a third or fourth component 37, 38 of the parallelogram guide 34 can be attached to each mounting frame part 27, 28, as already mentioned several times, so that a ski A, B is available for each foot of a user.

Also, as shown only in FIG. 15, which is a schematic spatial view of a foot receiving device 55, the standing device 2 has a foot receiving device 55 that receives a shoe of a user.

In this case, the foot receiving device 55 has a base member 56 which is fixed to a connecting component 31 of the corresponding mounting frame part 27, 28 and on which the sole of a shoe of a user can be placed.

The base member 56 is formed as a plate and with protrusions 68 to increase friction between the sole of a shoe and the base member 56.

Further, the foot receiving device 55 has a retaining device 57 attached to a connecting component 31 of the corresponding mounting frame part 27, 28, which at least partially prevents removal of a shoe of a user through an opening 58 between the retaining device 57 and the base member 56 of the foot receiving device 55.

As shown in FIG. 15, the retaining device 57 is U-section-shaped, with one of the two opposing flanges 69 of the U-section-shaped retaining device 57 being attached to the base member 56 of the foot receiving device 55 and/or to the connecting component 31 of the corresponding mounting frame part 27, 28.

The retaining device 57 has a guide 59 along which one of the two opposing flanges 70 of the U-section-shaped retaining device 57 is slidably arranged to adjust the distance between the flange 70 and the base member 56 and/or the position (regarding the inclination of the flange 70) in the direction of travel F to the size and shape of a shoe of a user.

As FIGS. 1, 3 and 6, 9 and 14 show, the ski winter sports device 1 is configured such that the frame 3 and the holding device 4 together have an upside-down V-shaped configuration when in the operating state.

Also, in the operating state, the frame 3 and the holding device 4 are configured to be rotationally rigid with respect to each other about a horizontal axis G3, which is aligned transversely to the direction of travel F.

Furthermore, the ski winter sports device 1 is configured in such a way that the frame 3 and the holding device 4 remain rotatably connected to each other after a quick-connection device 67C of a second connecting device 60 has been released without tools or destruction, so that the ski winter sports device 1 can be transferred from the operating state to the transport state and vice versa by moving the holding device 4 relative to the frame 3 (cf. FIGS. 3 to 8).

Also, the ski winter sports device 1 is configured such that the frame 3 and the holding device 4 are rotationally rigidly connected to each other after the tool-less and releasable installation of a quick-connection device 67C of a second connecting device 60, so that it is not possible to transfer from the operating state to the transport state and vice versa by moving the frame 3 relative to the holding device 4.

FIG. 16 shows an enlarged, spatial view of the ski winter sports device of FIG. 1, while FIG. 17 shows a side view of the ski winter sports device 1 of FIG. 1 in an operating state, identical to FIG. 3.

For simplicity and brevity, both FIGS. 16 and 17 are described together below.

Thus, said drawings show the frame 3 of the ski winter sports device 1, as already described, which serves to connect with the holding device 4 and with the standing device 2 of a ski winter sports device 1.

Here, the frame 3 has the frame component 17 with a first and a second end 18, 19, wherein the standing device 2 is arranged at the first end 18 and the holding device 4 is arranged at the second end 19.

The frame component 17 has a plurality of recesses 20, 21, 22 as a lightweight measure and is formed from a sheet of metal whose width and length are much greater than its thickness. Each frame component 17 has been created by a stamping process, a laser cutting process, a milling process and/or a cutting process.

The recesses 20, 21, 22 have an angular shape and are in the form of a honeycomb structure.

The first end 18 has a pivot point 23 to which the first connecting device 5 of the ski winter sports device 1 is rotatably attached, and which is formable into a swivel joint.

At this pivot point 23, the frame component 17 is pivotally connected to the first pivot point 7 of the first connecting elements 6 of the first connecting device 5 to form a swivel joint.

Further, the frame component 17 has a first junction 24 to the first connecting device 5 at the first end 18 to prevent relative movement of the frame 3 and the first connecting elements 6 of the first connecting device 5 about the pivot point 23 with the aid of a tool-less, non-destructively releasably fastenable quick-connection device 67A.

The second end 19 also has a rotational point 25 to which the holding device 4 of the ski winter sports device 1 is rotatably attached.

The frame component 17 further has a second junction 26 to the holding device 4 at the second end 19 to prevent relative movement of the frame 3 and the holding device 4 about the rotational point 25 with the aid of a tool-less, non-destructively releasably fastenable quick-connection device 67C, In this case, the rotational point 25 and the second junction 26 are spaced apart from one another, the second junction 26 being adapted to a quick-connection device 67C, which can be fastened in a toolless, non-destructively releasable manner, in terms of shape and fit, in particular configured as a clearance fit or as a transition fit.

As can be seen in, for example, FIGS. 6 to 8, the frame 3 has—strictly speaking-two frame components 17 which are spaced apart from one another in order to receive therebetween a third connecting element 61 (cf. FIG. 16) for connection to the holding device 4 and the first connecting device 5 which connects the frame 3 to the standing device 2 so as to be movable relative to one another.

As indicated above, the ski winter sports device 1 has a second connecting device 60 for attaching the holding device 4 to the frame 3.

The second connecting device 60 is configured to quickly allow and quickly stop pivoting of the frame 3 and the holding device 2.

The second connecting device 60 comprises the third connecting element 61 for connecting the frame 3 to the holding device 2, wherein the third connecting element 61 is arranged between two frame components 17 of the frame 3 (cf. FIGS. 16 and 6 to 8).

The third connecting element 61 is also hinged to the frame 3.

Also, the third connecting element 61 has a pivot point 62, in particular formed as a feedthrough, about which the holding device 4 is rotatably attached to the frame 3, in particular in the transport state.

The pivot point 62 is configured for a bolt or screw, wherein the pivot point 62 and the rotational point 25 of the second end 19 of the frame components 17 of the frame 3 form a swivel joint.

Furthermore, FIG. 16 in particular shows that the third connecting element 61 comprises a quick-connection point 63, in particular formed as a feedthrough and/or formable into a swivel joint, in order to prevent the relative rotational movement of the holding device 4 to the frame 3 about the pivot point 62 with the aid of the quick-connection device 67C, which can be fastened without tools and in a non-destructively releasable manner.

The quick-connection point 63 and the second junction 26 at the second end 19 of the frame component 17, together with the pivot point 62 and the rotational point 25, form a lockable and releasable swivel joint.

In this case, the quick-connection point 63 is adapted to a toolless quick-connection device 67C that can be fastened in a non-destructively releasable manner with respect to shape and fit, in particular formed as a clearance fit or as a transition fit.

Further, the pivot point 62 and the quick-connection point 63 are spaced apart so that relative rotation can be prevented by the holding device 4 and the frame 3.

In the operating state, the frame 3 and the third connecting element 61 are connected positively and/or non-positively, in particular with the aid of the quick-connection device 67C.

As shown in particular in FIGS. 16 and 17, the holding device 4 has a head tube element 64 for receiving a steerer tube of a steering fork 65.

The head tube element 64 allows relative rotation of the steerer tube and frame 2 to achieve a change in direction for a ski C on the holding device 4 with the aid of a rotation of the steering fork 65.

Furthermore, as just mentioned, the holding device 4 for holding has a handlebar 66 and a steering fork 65, in particular a bicycle fork.

The holding device 4 and the frame 3 are configured in such a way that the handlebar 66 can be rotated relative to the frame 3 so that the direction of a ski C on the holding device 2 can be changed in its direction.

As already mentioned several times, the ski winter sports device 1 has several quick-connection devices 67A, 67B, 67C for toolless, non-destructive and releasable mounting of devices and/or elements and is configured to quickly and non-destructively release the holding device 4 from the frame 3 and the standing device 2 from the frame 3 and the parallelogram guide 34 from the mounting frame parts 27, 28 as well as to quickly connect them in order to transfer the ski winter sports device 1 from the transport state to the operating state or vice versa.

In this case, the quick-connection device 67A is configured to connect the first connecting elements 6 of the first connecting device 5 to the frame 3 in a toolless, non-destructive and releasably fastenable manner, whereas the quick-connection device 67C is configured to connect the frame 3, in particular its frame components 17, to a third connecting element 61 of the second connecting device 60 in a toolless, non-destructive and releasably fastenable manner.

In addition, the quick-connection device 67B is configured to connect the third and fourth components 37, 38 of the parallelogram guide 34 to the mounting frame parts 27, 28 in a toolless, non-destructive and releasably fastenable manner.

Although not evident from the drawings, the quick-connection device 67A, 67B, 67C are configured as plug-in pins, in particular as plug-in pins with a safety device to prevent them from being pulled out.

In this case, the quick-connection device 67A, 67B, 67C, which are configured as plug-in pins, have a hole at their first end for a split pin, in particular for a folding pin or for a spring split pin, transverse to the axial direction thereof. At their second end they have a grip part for gripping and guiding.

Alternatively, it is possible for all three quick-connection device 67A, 67B, 67C to have different designs.

For example, each quick-connection device 67A, 67B, 67C may also include a snap lock formed similar to a carabiner that receives or secures a plug-in element having a shape similar to a screw and formed on a device or element.

Also, each quick-connection device 67A, 67B, 67C may be formed as a snap lock comprising a strap and a clamping lever, wherein the snap lock connects a device, part or element to another device, part or element in a force-locking and/or form-locking manner.

Generally, each quick-connection device 67A, 67B, 67C and the junctions and quick-connection points have a fit, particularly a clearance fit or a transition fit.

Finally, it should be noted that a pivot point and/or rotational point is configured as a feedthrough, wherein the swivel joint formed by these is configured to be lockable and/or releasable.

The swivel joint or the swivel joint formed by a pivot point and/or by a rotational point, in which one component is relatively rotatable with respect to another component, is configured as a plain bearing. This seems most suitable for temperatures around freezing point.

In summary, it can be stated for FIGS. 1 to 17 that in the transport state, the overall length GL of the ski winter sports device 1 is at least 30% less than in the operating state.

Also, the overall length GL of the ski winter sports device 1 in the operating state and viewed in the direction of travel F is formed by the distance from the foremost end of the holding device 4 with steering fork 65 to the rearmost end of the standing device 2, in particular to the rear end of the mounting frame parts 27, 28.

In the transport state, on the other hand, the overall length GL of the ski winter sports device 1 and viewed in the direction of travel F is formed by the distance from the upper end 15 of the tilting member 14 of the standing device 2 to the rearmost end of the standing device 2, in particular to the rear end of the mounting frame parts 27, 28.

Furthermore, it is shown in FIGS. 1 to 17 that in the transport state, the overall height GH of the ski winter sports device 1 is at least 30% less than in the operating state.

The overall height GH of the ski winter sports device 1 is formed by the distance from the highest end of the holding device 4 to the mounting frame parts 27, 28 when viewed transversely to the direction of travel F in the operating state.

In the transport state, the overall height of the ski winter sports device 1, viewed transversely to the direction of travel F, is formed by the distance from the highest end of the holding device 4 to the mounting frame parts 27, 28.

Furthermore, it should be mentioned that the frame 3 may comprise a carrying device for carrying by hand and/or for hanging on a seat of a ski lift (not shown).

Thus, FIGS. 1 to 17 show a ski winter sports device 1 on which three skis A, B, C can be arranged, wherein the three skis A, B, C can be arranged relative to one another in a manner similar to the wheels of a tricycle and the ski C of the holding device 4 can be arranged in front of the two skis A, B of the standing device 2 in the direction of travel F.

The ski C of the holding device 4, viewed transversely to the direction of travel F of the ski winter sports device 1, can be arranged between two skis A, B of the standing device 2, wherein the first mounting frame part 27 and the second mounting frame part 28 and thus the two skis A, B being arranged hip-width apart.

The present invention is not limited to embodiments described herein; reference should be had to the appended claims.

LIST OF REFERENCE SIGNS 1 ski winter sports device
2 standing device
3 frame
4 holding device
5 first connecting device
6 first connecting element
7 first pivot point
8 second pivot point
9 junction
10 second connecting element
11 pivot point
12 first end stop
13 second end stop
14 tilting member
15 upper end
16 lower end
17 frame component of the frame
18 first end
19 second end
20 recess
21 recess
22 recess
23 pivot point
24 first junction
25 rotational point
26 second junction
27 first mounting frame part of the standing device
28 second mounting frame part of the standing device
29 frame member of the standing device
30 frame member of the standing device
31 connecting component
32 rotational point
33 quick-connection point
34 parallelogram guide
35 first component
36 second component
37 third component
38 fourth component
39 swivel joint
40 swivel joint
41 swivel joint
42 swivel joint
43 swivel joint
44 swivel joint
45 rotational point
46 quick-connection point
47 fifth component
48 pivot point
49 pivot point
50 pivot point
51 connection device
52 energy storage
53 first end
54 second end
55 foot receiving device
56 base member
57 retaining device
58 opening
59 guide
60 second connecting device
61 third connecting element
62 pivot point
63 quick-connection point
64 head tube element
65 steering fork
66 handlebar
67A quick-connection device of the first connecting device
67B quick-connection device
67C quick-connection device of the second connecting device
68 protrusion
69 flange
70 flange A ski
B ski
C ski
L short leg
K long leg
F direction of travel
G horizontal axis
G1 horizontal axis
G2 horizontal axis
G3 horizontal axis
G4 horizontal axis
H axis of rotation
S1 first leg
S2 second leg
RV spatial volume
GL overall length
GH overall height
H height
L length
T depth

What is claimed is:

1. A ski winter sports device for sliding down a hill, the ski winter sports device comprising:
three skis comprising a first ski, a second ski, and a third ski;
a standing device which is configured to have a user stand thereon, wherein the first ski and the second ski are arrangeable on the standing device next to each other in a direction of travel so that the first ski is available for a first foot of the user and the second ski is available for a second foot of the user;
a holding device which can be held by at least one hand of the user; and
a frame which is configured to connect the standing device to the holding device, the frame being connected to the standing device in a relatively movable manner, wherein,
the frame and the standing device are configured to be foldable relative to each other so that a required spatial volume of the ski winter sports device can be reduced,
in the operating state in which the ski winter sports device is ready for use for sliding down the hill, the relative movement of the frame and the standing device with respect to one another is limited so that the frame and the standing device can be moved relative to one another within a limited range or a limited angular range so as to provide a safe sliding down the hill, and
in the transport state in which the ski winter sports device is transportable to the place of use, the relative movement of the frame and the standing device is increased so that the frame and the standing device are movable relative to each other beyond the limited range or the limited angular range, so that the required spatial volume of the ski winter sports device can be reduced compared to the operating state.

2. The ski winter sports device as recited in claim 1, wherein,
the ski winter sports device is a ski trike, and
the required spatial volume of the ski winter sports device which can be reduced via the frame and the standing device being configured to be foldable relative to each other is at least one of an overall length and an overall height of the ski winter sports device.

3. The ski winter sports device as recited in claim 1, wherein,
the ski winter sports device is configured to be transferred from a transport state to an operating state and vice versa without a tool, the transport state being where the ski winter sports device is transportable to a place of use and the operating state being where the ski winter sports device is ready for sliding down the hill, and
the required spatial volume of the ski winter sports device in the operating state is larger than in the transport state.

4. The ski winter sports device as recited in claim 3, wherein the required spatial volume of the ski winter sports device in the operating state which is larger than in the transport state is at least one of a larger overall length and an overall height.

5. The ski winter sports device as recited in claim 3, wherein, in the transport state, the frame and the standing device are at least one of,
movable toward each other similar to rotatably interconnected levers of a closing pair of scissors or similar to a folding blade of a pocketknife, and
movable away from each other similar to rotatably interconnected levers of an opening pair of scissors or similar to an unfolding blade of a pocketknife.

6. The ski winter sports device as recited in claim 5, wherein, in the operating state, the frame is configured to be movable in a limited angular range relative to the standing device so that an unevenness of a ski slope during a sliding downhill can be compensated for by a relative movement of the frame and the standing device within a limited angular range.

7. The ski winter sports device as recited in claim 3, further comprising:
a first connecting device comprising a quick-connection mechanism,
wherein at least one of,
the ski winter sports device is configured so that the frame and the standing device remain rotatably connected to each other beyond a limited angular range after a toolless and non-destructive release of the quick-connection mechanism of the first connecting device so that the ski winter sports device can be transferred from the operating state to the transport state and vice versa by moving the frame relative to the standing device, and
the ski winter sports device is configured so that the frame and the standing device are rotatably connected to each other in a limited angular range after a toolless and releasable installation of the quick-connection mechanism of the first connecting device so that, by moving the frame relative to the standing device, an unevenness of a ski slope during a sliding downhill can be compensated for via a relative movement of the frame and the standing device within the limited angular range, and it is not possible to transfer from the operating state to the transport state and vice versa by moving the frame relative to the standing device.

8. The ski winter sports device as recited in claim 1, wherein,
the third ski is arrangeable on the holding device, and
the frame and the holding device are configured to be foldable relative to each other so that the required spatial volume of the ski winter sports device can be reduced.

9. The ski winter sports device as recited in claim 8, wherein,
the ski winter sports device is a ski trike, and
the required spatial volume of the ski winter sports device which can be reduced via the frame and the holding device being configured to be foldable relative to each other is at least one of an overall length and an overall height of the ski winter sports device.

10. The ski winter sports device as recited in claim 8, wherein the ski winter sports device can be folded about at least one axis which is oriented perpendicular to the direction of travel of the ski winter sports device.

11. The ski winter sports device as recited in claim 10, wherein at least one of,
    the frame and the standing device are at least one of foldable and movable about at least one horizontal axis which is oriented transversely to the direction of travel, and
    the frame and the holding device are at least one of foldable and movable about at least one horizontal axis which is aligned transversely to the direction of travel.

12. The ski winter sports device as recited in claim 8, wherein,
    the ski winter sports device is configured to be transferred from a transport state to an operating state, the transport state being where the ski winter sports device is transportable to a place of use and the operating state being where the ski winter sports device is ready for sliding down the hill, and
    the required spatial volume of ski winter sports device is larger in the operating state than in the transport state, and
    wherein at least one of,
    in the transport state, the frame and the holding device are at least one of,
        movable toward each other similar to rotatably interconnected levers of a closing pair of scissors or similar to a folding blade of a pocketknife, and
        movable away from each other similar to rotatably interconnected levers of an opening pair of scissors or similar to an unfolding blade of a pocketknife, and
    in the operating state, the frame and the holding device are configured to be rotationally rigid with respect to one another about a horizontally lying axis which is aligned transversely to the direction of travel.

13. The ski winter sports device as recited in claim 12, further comprising:
    a first connecting device which is configured to,
        connect the frame to the standing device so as to be movable relative to each other,
        connect the frame and the standing device to each other in an articulated manner,
        limit the relative movement of the frame and the standing device relative to each other in the operating state in which the ski winter sports device is ready for a use of sliding down the hill so that the frame and the standing device can be moved relative to one another within a limited range so as to provide for a safe sliding down the hill, and
        increase the relative movement of the frame and the standing device in the transport state in which the ski winter sports device can be transported to the place of use, so that by folding the frame and the standing device relative to each other the required spatial volume of the ski winter sports device can be reduced compared to the operating state.

14. The ski winter sports device as recited in claim 13, wherein,
    the standing device comprises a first mounting frame part and a second mounting frame part which are each configured for arranging at least one of a foot receiving device and one of the first ski or the second ski, and a parallelogram guide which is configured to synchronize an inclination of the first mounting frame part and the second mounting frame part and thereby the first ski and the second ski transversely to the direction of travel,
    the parallelogram guide is a parallelogram linkage or a gear of a four bar linkage, the respective opposite links of which are of an equal length,
    the parallelogram guide comprises a first component, a second component, a third component, and a fourth component,
    the first mounting frame part comprises at least one frame member which comprises a first frame member of the standing device and a second frame member of the standing device,
    the second mounting frame part comprises at least one frame member which comprises a first frame member of the standing device and a second frame member of the standing device,
    the third component is rotatably arranged on the at least one frame member of the first mounting frame part, and,
    the fourth component is rotatably arranged on the at least one frame member of the second mounting frame part.

15. The ski winter sports device as recited in claim 14, wherein,
    the parallelogram guide further comprises a fifth component which is configured to hingedly connect respective rear ends, as seen with respect to the direction of travel, of the first mounting frame part and of the second mounting frame part to each other, and
    the standing device further comprises a connection device which is configured to connect the fifth component of the parallelogram guide to at least one of the frame and the first connecting device.

16. The ski winter sports device as recited in claim 15, wherein the connection device comprises at least one of an energy storage and an energy converter, and at least one of a spring element and a damper element.

17. The ski winter sports device as recited in claim 12, further comprising:
    a second connecting device which is configured to attach the holding device to the frame,
    wherein,
    the second connecting device is configured to allow and stop a pivoting of the frame and the holding device.

18. The ski winter sports device as recited in claim 17, wherein,
    the second connecting device comprises a third connecting element for connecting the frame to the holding device,
    the third connecting element is arranged in an articulated manner on the frame, and
    in the operating state, the frame and the third connecting element are at least one of positively connected and non-positively connected.

19. The ski winter sports device as recited in claim 14, further comprising:
    at least one quick-connection device which is configured to provide for a toolless, non-destructive and releasable mounting so as,
    to non-destructively release at least one of,
        the holding device from the frame,
        the standing device from the frame, and
        the parallelogram guide from at the first mounting frame part and the second mounting frame part, and
    to connect at least one of,
        the holding device to the frame, the standing device to the frame, and
the parallelogram guide to the first mounting frame part and to the second mounting frame part,
so as to transfer the ski winter sports device from the transport state to the operating state or vice versa.

20. A ski winter sports device for sliding down a hill, the ski winter sports device comprising:
three skis comprising a first ski, a second ski, and a third ski;
a standing device which is configured to have a user stand thereon, wherein the first ski and the second ski are arrangeable on the standing device next to each other in a direction of travel so that the first ski is available for a first foot of the user and the second ski is available for a second foot of the user;
a holding device which can be held by at least one hand of the user; and
a frame which is configured to connect the standing device to the holding device, the frame being connected to the standing device in a relatively movable manner, wherein,
the frame and the standing device are configured to be foldable relative to each other so that a required spatial volume of the ski winter sports device can be reduced,
the standing device comprises a first mounting frame part and a second mounting frame part which are each configured for arranging at least one of a foot receiving device and one of the first ski or the second ski, and a parallelogram guide which is configured to synchronize an inclination of the first mounting frame part and the second mounting frame part and thereby the first ski and the second ski transversely to the direction of travel,
the parallelogram guide is a parallelogram linkage or a gear of a four-bar linkage, the respective opposite links of which are of an equal length,
the parallelogram guide comprises a first component, a second component, a third component, and a fourth component,
the first mounting frame part comprises at least one frame member which comprises a first frame member of the standing device and a second frame member of the standing device,
the second mounting frame part comprises at least one frame member which comprises a first frame member of the standing device and a second frame member of the standing device,
the third component is rotatably arranged on the at least one frame member of the first mounting frame part, and
the fourth component is rotatably arranged on the at least one frame member of the second mounting frame part.

* * * * *